United States Patent
Joshi et al.

(10) Patent No.: US 10,440,631 B1
(45) Date of Patent: Oct. 8, 2019

(54) PAYLOAD TYPE AWARE ROUTING IN WIRELESS MESH NETWORKS

(71) Applicant: Amazon Technologies, Inc., Seattle, WA (US)

(72) Inventors: Avinash Joshi, San Jose, CA (US); Ashish Kumar Shukla, Milpitas, CA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 15/804,362

(22) Filed: Nov. 6, 2017

(51) Int. Cl.
  H04W 40/00 (2009.01)
  H04W 40/28 (2009.01)
  H04L 12/46 (2006.01)
  H04L 12/725 (2013.01)
  H04L 12/935 (2013.01)
  H04W 84/18 (2009.01)

(52) U.S. Cl.
  CPC ......... H04W 40/28 (2013.01); H04L 12/4645 (2013.01); H04L 45/306 (2013.01); H04L 49/3009 (2013.01); H04W 84/18 (2013.01)

(58) Field of Classification Search
  CPC .. H04W 40/28; H04W 84/18; H04L 12/4645; H04L 45/306; H04L 49/3009
  See application file for complete search history.

(56) References Cited

U.S. PATENT DOCUMENTS

| | | | |
|---|---|---|---|
| 6,895,182 B1 * | 5/2005 | Moriyama | H04J 3/085 370/222 |
| 7,872,993 B2 * | 1/2011 | Bailey | H04L 45/00 370/256 |
| 8,665,841 B1 * | 3/2014 | Goel | H04L 69/22 370/327 |
| 2002/0184529 A1 * | 12/2002 | Foster | H04L 49/357 726/4 |
| 2004/0039839 A1 * | 2/2004 | Kalyanaraman | H04L 45/00 709/238 |
| 2011/0292949 A1 * | 12/2011 | Hayashi | H04L 45/00 370/419 |

(Continued)

OTHER PUBLICATIONS

Chapter 11, 802.11r, 802.11k, 802.11v, 802.1w Fast Transition Roaming, 28 pages, Dec. 7, 2016.

(Continued)

*Primary Examiner* — Khai M Nguyen
(74) *Attorney, Agent, or Firm* — Lowenstein Sandler LLP

(57) ABSTRACT

A method of payload type aware routing in wireless mesh networks comprises: identifying, by a first mesh network device of a wireless mesh network, a plurality of path selection metric types supported by the wireless mesh network; identifying, by inspecting an outgoing data frame, a path selection metric type corresponding to a payload type of the outgoing data frame; determining that the path selection metric type is comprised by the plurality of path selection metric types supported by the wireless mesh network; determining, using the path selection metric type, a network path to a destination mesh network device of the outgoing data frame, wherein the network path comprises an identifier of an intermediate mesh network device between the first mesh network device and the destination mesh network device; and transmitting the outgoing data frame to the intermediate mesh network device.

20 Claims, 13 Drawing Sheets

(56) References Cited

U.S. PATENT DOCUMENTS

2016/0150459 A1* 5/2016 Patil .................. H04L 45/72
 370/328
2019/0068489 A1* 2/2019 Shekhar ............... H04W 40/20

OTHER PUBLICATIONS

IEEE Std 802.11-2016, IEEE Standard for Information Technology—Local and Metropolitan Area Networks—Specific Requirements, Part 11: Wireless LAN MAC and PHY Specifications, pp. 205-209, 496-507, 520-527, 1024-1032, 1047, 1247-1259, 1404-1414, 1493-1499, 1659, 2084, 2132-2224, 2749, 3510-3517, Jul. 11, 2017.

* cited by examiner

| Destination node ID 820 | Path selection metric ID 830 | DSN 840 | Path selection metric value 850 | Hop count 860 | Next node on the path 870 | [other information] |
|---|---|---|---|---|---|---|
| 00-14-22-01-23-45 | 102 | 468 | 1234 | 3 | 00-14-22-01-23-98 | |
| 00-14-22-01-23-45 | 104 | 1024 | 2345 | 4 | 00-14-22-01-23-97 | |
| 00-14-22-01-23-60 | 102 | 2345 | 3456 | 5 | 00-14-22-01-23-85 | |
| 00-14-22-01-23-80 | 102 | 732 | 4567 | 4 | 00-14-22-01-23-72 | |

Routing table 800

PAYLOAD TYPE AWARE ROUTING IN WIRELESS MESH NETWORKS

BACKGROUND

A wireless mesh network may support establishing point-to-point wireless links between the participating communication devices. A network node may employ a path selection method supported by the network to discover a route to a desired destination.

BRIEF DESCRIPTION OF DRAWINGS

The examples described herein will be understood more fully from the detailed description given below and from the accompanying drawings, which, however, should not be taken to limit the application to the specific examples, but are for explanation and understanding only.

FIG. 8 schematically illustrated an example structure of a routing table maintained by a mesh network node in one embodiment.

DETAILED DESCRIPTION

Figure 1:
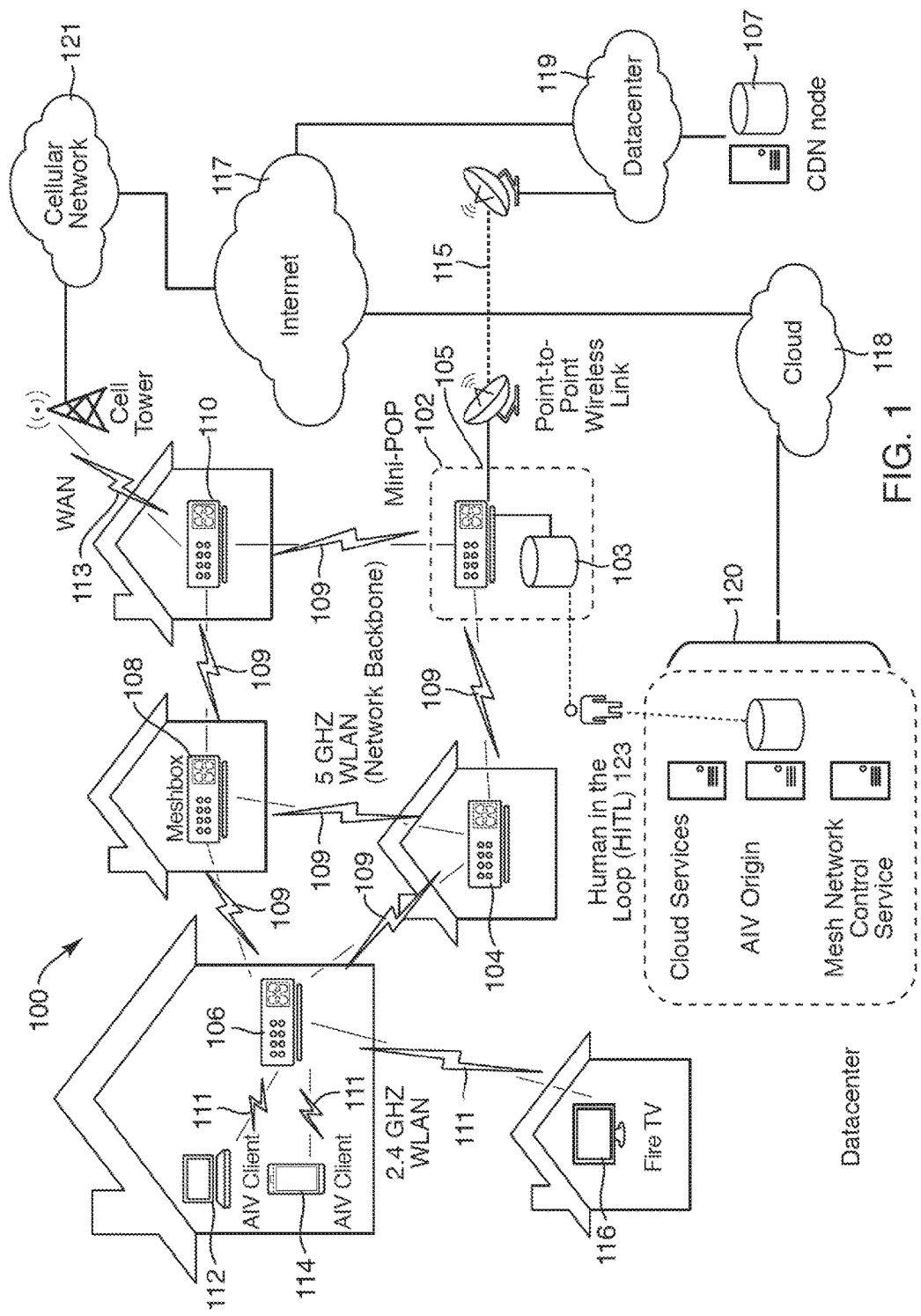
FIG. 1 is a component diagram illustrating hardware devices organized in a wireless mesh network.

Described herein are systems and methods for payload type aware routing in mesh networks.

Nodes of a mesh network may establish peer-to-peer wireless links for transmitting messages to each other. In particular, messages may be transferred, through other nodes, between the source and destination nodes that are not in direct communication with each other. If more than one path exists between the source and destination nodes, the best path may be selected which has the minimal value of a path selection metric. In one example, the path selection metric may reflect the time of delivering the frame from the source to the destination node.

Certain mesh networks may implement a single path selection metric to be utilized by all network nodes for path discovery. However, using the single path selection metric may not always produce the routes which are equally well-suited for various types of data being carried by the mesh network. For example, audio or video applications may require low latency delivery, while storage and other bulk transfer applications may require higher throughput while tolerating higher latency than audio or video applications. In another example, long range sensor applications may tolerate low throughput delivery.

Accordingly, the present disclosure provides a payload type-aware path selection approach, which enables multiple path selection metrics in a single mesh network. The source node and/or intermediate nodes may select one of the multiple path selection metrics based on the type of the transmitted data (which is referred herein as payload type). Examples of the payload type include audio or video applications, long range sensor applications, storage applications, bulk data transfer applications, etc. For each known payload type, a wireless mesh network may support a corresponding path selection metric, identified by a path selection metric type. Therefore, a path selection metric type may represent an identifier of a path selection metric to be utilized for path discovery. Examples of path selection metric types which may, in one embodiment, be supported by a wireless mesh network include a first metric type referencing a metric maximizing the path throughput, a second metric type referencing a metric that produces lower latency paths, a third metric type referencing a metric producing the lower power consumption path, and a fourth metric type referencing a metric producing the long range paths. The numerical values for encoding metric types and corresponding metric descriptions are provided herein as illustrative examples only. Wireless mesh networks operating in accordance with the embodiments of the present disclosure may support various other metrics and their respective encodings. Accordingly, the payload type-aware path selection may be viewed as a function of two parameters: the destination node identifier (e.g., the destination Medium Access Control (MAC) address) and the path selection metric type.

Various aspects of the above referenced methods and systems are described in details herein below by way of example, rather than by way of limitation.

FIG. 1 is a component diagram illustrating hardware devices organized in a wireless mesh network. As illustrated by FIG. 1, hardware devices 102-110 may be organized in a mesh network 100, for content distribution to client devices in an environment of limited connectivity to broadband Internet infrastructure in order to transfer digital content to one or more client consumption devices. In the depicted embodiment, the mesh network 100 includes a miniature point-of-presence (mini-POP) device 102 (also referred to as mini-POP device), having at least one of a first wired connection to an attached storage device 103 or a point-to-point wireless connection 105 to a CDN device 107 (server of a CDN or a CDN node) of an Internet Service Provider (ISP). The CDN device 107 may be a POP device (also referred to as a POP device), an edge server, a content server device or another device of the CDN. The mini-POP device 102 may be similar to POP devices of a CDN in operation. However, the mini-POP device 102 is called a miniature to differentiate it from a POP device of a CDN given the nature of the mini-POP device 102 being a single ingress point to the mesh network 100; whereas, the POP device of a CDN may be one of many in the CDN.

The point-to-point wireless connection 105 may be established over a point-to-point wireless link 115 between the mini-POP device 102 and the CDN device 107. Alternatively, the point-to-point wireless connection 105 may be established over a directional microwave link between the mini-POP device 102 and the CDN device 107. In other embodiments, the mini-POP device 102 is a single ingress node of the mesh network 100 for the content files stored in the mesh network 100. Meaning the mini-POP 102 may be the only node in the mesh network 100 having access to the attached storage or a communication channel to retrieve content files stored outside of the mesh network 100. In other embodiments, multiple mini-POP devices may be deployed in the mesh network 100, but the number of mini-POP devices should be much smaller than a total number of network hardware devices in the mesh network 100. Although a point-to-point wireless connection can be used, in other embodiments, other communication channels may be used. For example, a microwave communication channel may be used to exchange data. Other long distance communication channels may be used, such as a fiber-optic link, satellite link, cellular link, or the like. The network hardware devices of the mesh network 100 may not have direct access to the mini-POP device 102, but can use one or more intervening nodes to get content from the mini-POP device. The intervening nodes may also cache content that can be accessed by other nodes. The network hardware devices may also determine a shortest possible route between the requesting node and a node where a particular content file is stored.

The CDN device 107 may be located at a datacenter 119 and may be connected to the Internet 117. The CDN device 107 may be one of many devices in the global CDN and may implement the Amazon CloudFront technology. The CDN device 107 and the datacenter 119 may be co-located with the equipment of the point-to-point wireless link 155. The point-to-point wireless connection 105 can be considered a broadband connection for the mesh network 100. In some cases, the mini-POP device 102 does not have an Internet connection via the point-to-point wireless connection 105 and the content is stored only in the attached storage device 103 for a self-contained mesh network 100.

The mesh network 100 also includes multiple mesh nodes 104-110 which may establish multiple P2P wireless connections 109 among themselves in order to form a network backbone. It should be noted that only some of the possible P2P wireless connections 109 are shown between the mesh nodes 104-110 in FIG. 1. In particular, a first mesh node 104 is wirelessly coupled to the mini-POP device 102 via a first P2P wireless connection 109, as well as being wirelessly coupled to a second mesh node 106 via a second P2P wireless connection 109 and a third mesh node 108 via a third P2P wireless connection. The mesh nodes 104-110 (and the mini-POP device 102) may be provided by multichannel (MRMC) mesh network devices. As described herein, the mesh nodes 104-110 do not necessarily have reliable access to the CDN device 107. The mesh nodes 104-110 (and the mini-POP device 102) wirelessly communicate with other nodes via the network backbone via a first set of WLAN channels reserved for inter-node communications. The mesh nodes 102-110 communicate data with one another via the first set of WLAN channels at a first frequency of approximately 5 GHz (e.g., 5 GHz band of the Wi-Fi® network technologies).

Each of the mesh nodes 104-110 (and the mini-POP device 102) also includes multiple node-to-client (N2C) wireless connections 111 to wirelessly communicate with one or more client consumption devices via a second set of WLAN channels reserved for serving content files to client consumption devices connected to the mesh network 100. In particular, the second mesh node 106 is wirelessly coupled to a first client consumption device 112 (Amazon Instant Video (AIV) client) via a first N2C wireless connection 111, a second client consumption device 114 (AIV client) via a second N2C wireless connection 111, and a third client consumption device 116 (e.g., the Fire TV device) via a third N2C wireless connection 111. The second mesh node 106 wirelessly communicates with the client consumption devices via the second set of WLAN channels at a second frequency of approximately 2.4 GHz (e.g., 2.4 GHz band of the Wi-Fi® network technologies).

Each of the mesh nodes 104-110 (and the mini-POP device 102) also includes a cellular connection 113 to wirelessly communicate control data between the respective node and a second device 118 hosting a mesh network control service described below. The cellular connection 113 may be a low bandwidth, high availability connection to the Internet 117 provided by a cellular network. The cellular connection 113 may have a lower bandwidth than the point-to-point wireless connection 105. There may be many uses for this connection including, health monitoring of the mesh nodes, collecting network statistics of the mesh nodes, configuring the mesh nodes, and providing client access to other services. In particular, the mesh node 110 connects to a cellular network 121 via the cellular connection 113. The cellular network 121 is coupled to the second device 118 via the Internet 117. The second device 118 may be one of a collection of devices organized as a cloud computing system that that hosts one or more services 120. The services 120 may include cloud services to control setup of the mesh nodes, the content delivery service (e.g., AIV origin), as well as other cloud services. The mesh network control service can be one or more cloud services. The cloud services can include a metric collector service, a health and status service, a link selection service, a channel selection service, a content request aggregation service, or the like. There may be application programming interfaces (APIs) provided for each of these services. Although this cellular connection may provide access to the Internet 117, the amount of traffic that goes through this connection should be minimized, since it may be a relatively costly link. This cellular connection 113 may be used to communicate various control data to configure the mesh network for content delivery. In addition, the cellular connection 113 can provide a global view of the state of the mesh network 100 remotely. Also, the cellular connection 113 may aid in the debugging and optimization of the mesh network 100. In other embodiments, other low bandwidth services may also be offered through this link (e.g. email, shopping on Amazon.com, or the like).

Although only four mesh nodes 104-110 are illustrated in FIG. 1, the mesh network 100 can use many mesh nodes, wireless connected together in a mesh network, to move content through the mesh network 100. The 5 GHz WLAN channels are reserved for inter-node communications (i.e., the network backbone). Theoretically, there is no limit to the number of links a given mesh node can have to its neighbor nodes. However, practical considerations, including memory, routing complexity, physical radio resources, and link bandwidth requirements, may place a limit on the number of links maintained to neighboring mesh nodes. Mesh nodes may function as traditional access points (APs) for devices running AIV client software. The 2.4 GHz WLAN channels are reserved for serving client consumption devices. The 2.4 GHz band may be chosen for serving clients because there is a wider device adoption and support for this band. Additionally, the bandwidth requirements for serving client consumption devices will be lower than that of the network backbone. The number of clients that each mesh node can support depends on a number of factors including memory, bandwidth requirements of the client, incoming bandwidth that the mesh node can support, and the like. For example, the mesh nodes provide coverage to users who subscribe to the content delivery service and consume that service through an AIV client on the client consumption devices (e.g., a mobile phone, a set top box, a tablet, or the like). It should be noted that there is a 1-to-many relationship between mesh nodes and households (not just between nodes and clients). This means the service can be provided without necessarily requiring a customer to have a mesh node located in their house, as illustrated in FIG. 1. As illustrated, the second mesh node 106 services two client consumption devices 112, 114 (e.g., AIV clients) located in a first house, as well as a third client consumption device 116 (e.g., the Fire TV client) located in a second house. The mesh nodes can be located in various structures, and there can be multiple mesh nodes in a single structure.

The mesh network 100 may be used to accomplish various tasks, including moving high bandwidth content to users and storing that content in the network itself. The content moving task may be performed by hardware using the radio links between mesh nodes and the radio links between mesh nodes and client consumption devices, and by software using the routing protocols used to decide where to push traffic and link and channel management used to configure the mesh network 100. The content storing task may be performed using caches of content close to the user. An example content delivery network (CDN) implementation is the AWS CloudFront service. The AWS CloudFront service may include several point-of-presence (POP) racks that are co-located in datacenters that see a lot of customer traffic (for example an ISP), such as illustrated in datacenter 119 in FIG. 1. A POP rack has server devices to handle incoming client requests and storage devices to cache content for these requests. If the content is present in the POP rack, the content is served to the client consumption device from there. If it is not stored in the POP rack, a cache miss is triggered and the content is fetched from the next level of cache, culminating in the "origin," which is a central repository for all available content. In contrast, as illustrated in FIG. 1, the mesh network 100 includes the mini-POP device 102 that is designed to handle smaller amounts of traffic than a typical POP rack. Architecturally, the mini-POP device 102 may be designed as a mesh node with storage attached (e.g. external hard disk). The mini-POP device 102 may function identically to a POP device with the exception of how cache misses are handled. Because of the lack of broadband Internet infrastructure, the mini-POP device 102 has no traditional Internet connection to the next level of cache.

The mesh network 100 may be considered a multi-radio multi-channel (MRMC) mesh network. MRMC mesh networks are an evolution of traditional single radio mesh networks and a leading contender for combatting the radio resource contention that has plagued single radio mesh networks and prevents them from scaling to any significant size. The mesh network 100 has multiple devices, each with multi-radio multi-channel (MRMC) radios. The multiple radios for P2P connections and N2C connections of the mesh network devices allow the mesh network 100 to be scaled to a significant size, such as 10,000 mesh nodes. For example, unlike the conventional solutions that could not effectively scale, the embodiments described herein can be very large scale, such as a 100×100 grid of nodes with 12-15 hops between nodes to serve content to client consumption devices. A "hop" as used herein may refer to a portion of a network path between two neighboring nodes. The paths to fetch content files may not be a linear path within the mesh network.

The mesh network 100 can provide adequate bandwidth, especially node-to-node bandwidth. For video, content delivery services recommend a minimum of 900 Kbps for standard definition content and 3.5 Mbps for high definition content. The mesh network 100 can provide higher bandwidths than those recommended for standard definition and high definition content.

In some embodiments, the mesh network 100 can be self-contained as described herein. The mesh network 100 may be self-contained in the sense that content resides in, travels through, and is consumed by nodes in the mesh network without requiring the content to be fetched outside of the mesh network 100. In other embodiments, the mesh network 100 can have mechanisms for content injection and distribution. One or more of the services 120 can manage the setup of content injection and distribution. These services (e.g., labeled mesh network control service) can be hosted by as cloud services, such as on one or more content delivery service devices. These mechanisms can be used for injecting content into the network as new content is created or as user viewing preferences change. Although these injection mechanisms may not inject the content in real time, the content can be injected into the mesh network 100 via the point-to-point wireless connection 105 or the HITL process at the mini-POP device 102.

In some embodiments, prior to consumption by a node having an AIV client itself or being wirelessly connected to an AIV client executing on a client consumption device, the content may be pulled close to that node. This may involve either predicting when content will be consumed to proactively move it closer (referred to as caching) or always having it close (referred to as replication).

The mesh network 100 can provide some fault tolerance so that a single mesh node becoming unavailable for failure or reboot has minimal impact on availability of content to other users. The mesh network 100 can be deployed in an unpredictable environment. Radio conditions may not be constant and sudden losses of power may occur. The mesh network 100 is designed to be robust to temporary failures of individual nodes. The mesh network 100 can be designed to identify those failures and adapt to these failures once identified. Additionally, the mesh network 100 can include mechanisms to provide secure storage of the content that resides within the mesh network 100 and prevent unauthorized access to that content.

The cloud services 120 of the mesh network 100 can include mechanisms to deal with mesh nodes that become unavailable, adding, removing, or modifying existing mesh nodes in the mesh network 100. The cloud services 120 may also include mechanisms for remote health and management. For example, there may be a remote health interface, a management interface, or both to access the mesh nodes for this purpose. The cloud services 120 can also include mechanisms for securing the mesh network 100 and the content that resides in the mesh network 100. For example, the cloud services 120 can control device access, digital rights management (DRM), and node authentication.

Other use cases of mesh networks operating in accordance with the embodiments of the present disclosure include employing mesh networks for residential, office, campus/community and public safety uses. In one example, mesh networks described herein may be employed to eliminate radio frequency dead spots and areas of low-quality wireless coverage in private residences or public spaces. In another example, mesh networks described herein may be employed to provide network access to emergency and safety personnel such as fire, police, and emergency medical technicians responding to an incident scene. Possible use cases of mesh networks operating in accordance with the embodiments of the present disclosure are not limited to the above-described examples.

Figure 2:
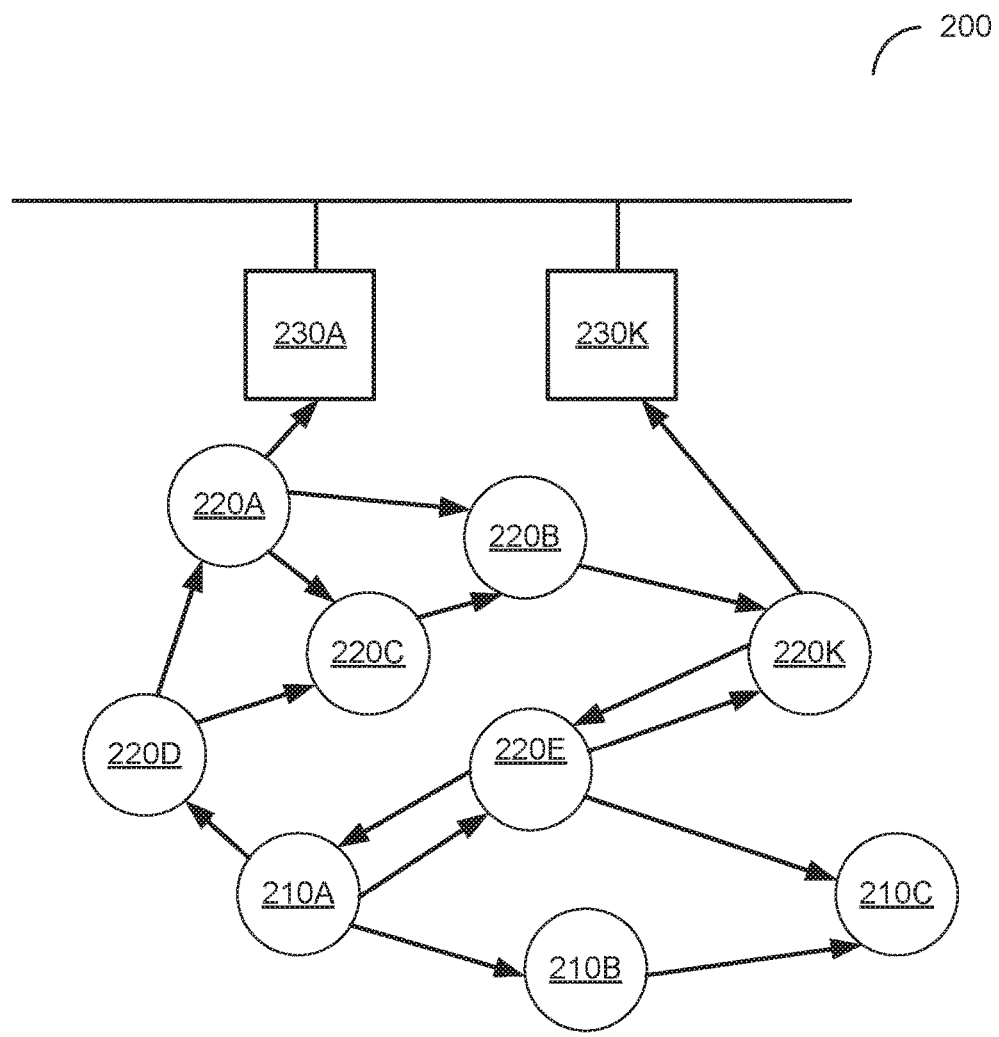
FIG. 2 is a functional network diagram of an illustrative example of a wireless mesh network operating in accordance with the embodiments of the present disclosure.

FIG. 2 is a functional network diagram of an illustrative example of a wireless mesh network operating in accordance with the embodiments of the present disclosure. In one embodiment, each of the network devices of wireless mesh network 100 of FIG. 1 may implement functions of one or more functional components of FIG. 2. In other embodiments, various other wireless mesh networks may include hardware and/or software components which may implement functions of one or more functional components of FIG. 2.

As schematically illustrated by FIG. 2, an example wireless mesh network 200 may include a plurality of mesh network nodes including communication devices that implement the functions of wireless mesh point stations (MP STA) 210A-210Z, mesh access points (MAP) 220A-220K, and mesh portals (MPP) 230A-220M. In one embodiment, the wireless mesh network 200 may be compliant with IEEE802.11s protocol, which supports broadcast/multicast and unicast delivery using radio-aware path selection metrics over self-configuring multi-hop topologies.

A wireless mesh point station may be provided by a communication device that includes hardware and/or software for implementing MAC and physical layer (PHY) interface to the wireless medium. A wireless access point may be provided by a wireless mesh point station that provides distribution services (i.e., forwarding MAC service data units (MSDUs) including data and network management frames to a wireless destination) via the wireless medium for associated wireless mesh point stations. A mesh portal is a wireless access point that provides distribution and integration services (i.e., MSDU translation to another network format and MSDU forwarding to a wireless or wired destination), e.g., by one or more wireline or wireless connections to a backbone network.

As noted herein above, mesh network nodes may establish peer-to-peer wireless links and transmit messages to each other. In particular, messages may be transferred, through other nodes, between two nodes that are not in direct communication with each other. Thus, a node may be a source, a destination, or an intermediate node on a mesh path.

Upon booting up, a mesh network node may discover and join the mesh network by transmitting beacon, probe request, and probe response frames. These and other frames transmitted by a mesh network node may include a mesh profile, which in turn includes a mesh identifier element and a mesh configuration element. The mesh identifier may identify a mesh basic service set (MBSS), which may be viewed as an elementary mesh network. The mesh configuration element may specify, among other mesh network parameters, the active path selection protocol and the active path selection metric to be employed by participating network devices for path discovery.

In one embodiment, a wireless mesh network operating in accordance with the embodiments of the present disclosure (e.g., wireless mesh network 100 of FIG. 1) may support the Hybrid Wireless Mesh Protocol, which implements both dynamic (reactive) path selection (i.e., best path selection by a node that needs to transmit a frame to a destination for which no path is known to the source node) and proactive path selection (i.e. determining best path to any destination before needing to send any data frame to that destination). In both modes, if more than one path exists between the source and destination nodes, the path having the minimal value of the path selection metric is selected. In one embodiment, the path selection metric may reflect the time of delivering the frame from the source to the destination node.

Figure 3:
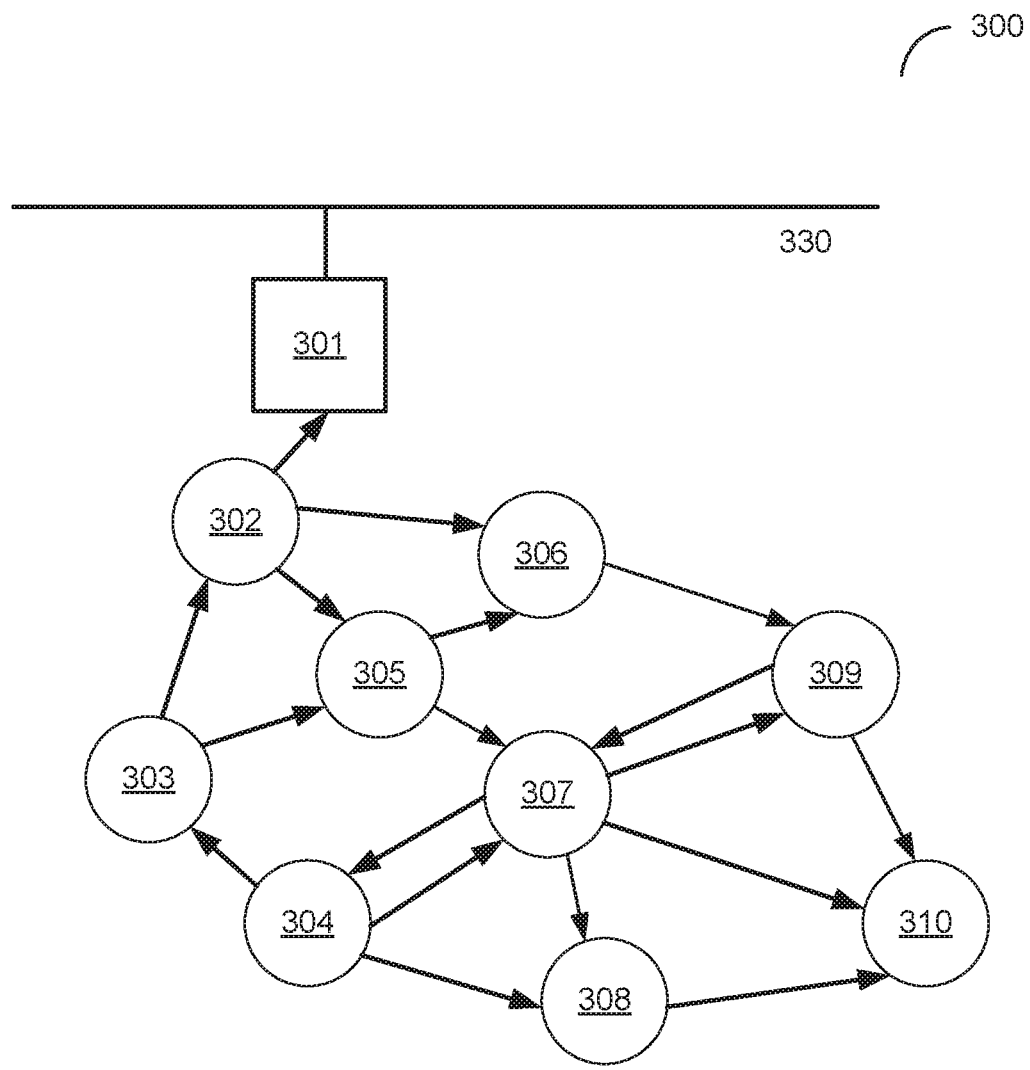
FIG. 3 schematically illustrates one embodiment of the dynamic (reactive) path selection mode in a wireless mesh network.

FIG. 3 schematically illustrates one embodiment of the dynamic (reactive) path selection mode in a wireless mesh network. In the example illustrated by FIG. 3, the wireless mesh network 300 may include nodes 301-310. The source node 304 may employ the dynamic path selection mode to find a path to the destination node 309. The source node 304 may broadcast a network management frame including a route request (RREQ) information element specifying the destination node 309 (e.g., using the MAC address of the destination node 309) and initializing the metric field to zero. Responsive to receiving a RREQ, an intermediate node (e.g., a node 303, 307, or 308) may increment the metric field of the RREQ to reflect the airtime of the last hop leading to this node. The intermediate node may then create a route to the source node 304 or update an existing route to the source node 304, and re-broadcast the RREQ by forwarding it to its neighboring nodes. Thus, whenever an intermediate node forwards a RREQ, the metric field in the RREQ will be updated to reflect the cumulative metric of the route to the source of the RREQ.

Responsive to receiving a RREQ, the destination node 309 may increment the metric field of the RREQ to reflect the airtime of the last hop leading to the destination node. The destination node 309 may then select, among a plurality of candidate network paths between the source node and the destination node, the network path having a minimal value of the path selection metric. The destination node 309 may send a unicast route reply (RREP) back to the source node 304.

Responsive to receiving a network management frame including the RREP information element specifying the destination, an intermediate node (e.g., a node 303, 307, or 308) may create or update a route to the destination node 309 and forward the RREP towards the source node 304. Upon receiving the RREP, the source node 304 may create a route to the destination node 309. Upon receiving further RREQs specifying the same source node 304 with a metric value better than the existing route, the destination node 309 may update its route to the source 304 and send a new RREP to the source node 304 along the updated route. Participating network nodes may store the created and/or updated routes in their respective routing tables. Thus a bidirectional, best metric end-to-end route is established between the source and destination.

In order to produce loop-free paths, each network node may maintain a destination sequence number (DSN) associated with every destination within the mesh network. The DSN is incremented each time when a new network path to the destination is created, and thus the current route to the destination may be identified by a combination of the DSN and the destination identifier. Accordingly, an existing route is updated in response to receiving a RREP if the DSN specified by the RREP exceeds the current DSN maintained by the receiving node in association with the destination node specified by the RREP, or if the two DSNs match and the new route provides a better metric value than the existing route. Similarly, an existing route is updated in response to receiving a RREQ if the DSN specified by the RREQ exceeds the current DSN maintained by the receiving node in association with the source node specified by the RREQ, or if the two DSNs match and the new route provides a better metric value than the existing route.

While in the example of FIG. 3 the destination node 309 is within the mesh network, in various other examples the destination may be outside of the wireless network, in which situation the source node would first discover the route to the mesh portal 301, which would then forward the messages to the desired destination via a wired network 330.

While the dynamic path selection mode is utilized in the routing examples described herein, methods and systems of the present disclosure may operate in both dynamic and proactive path selection modes.

Figure 4:
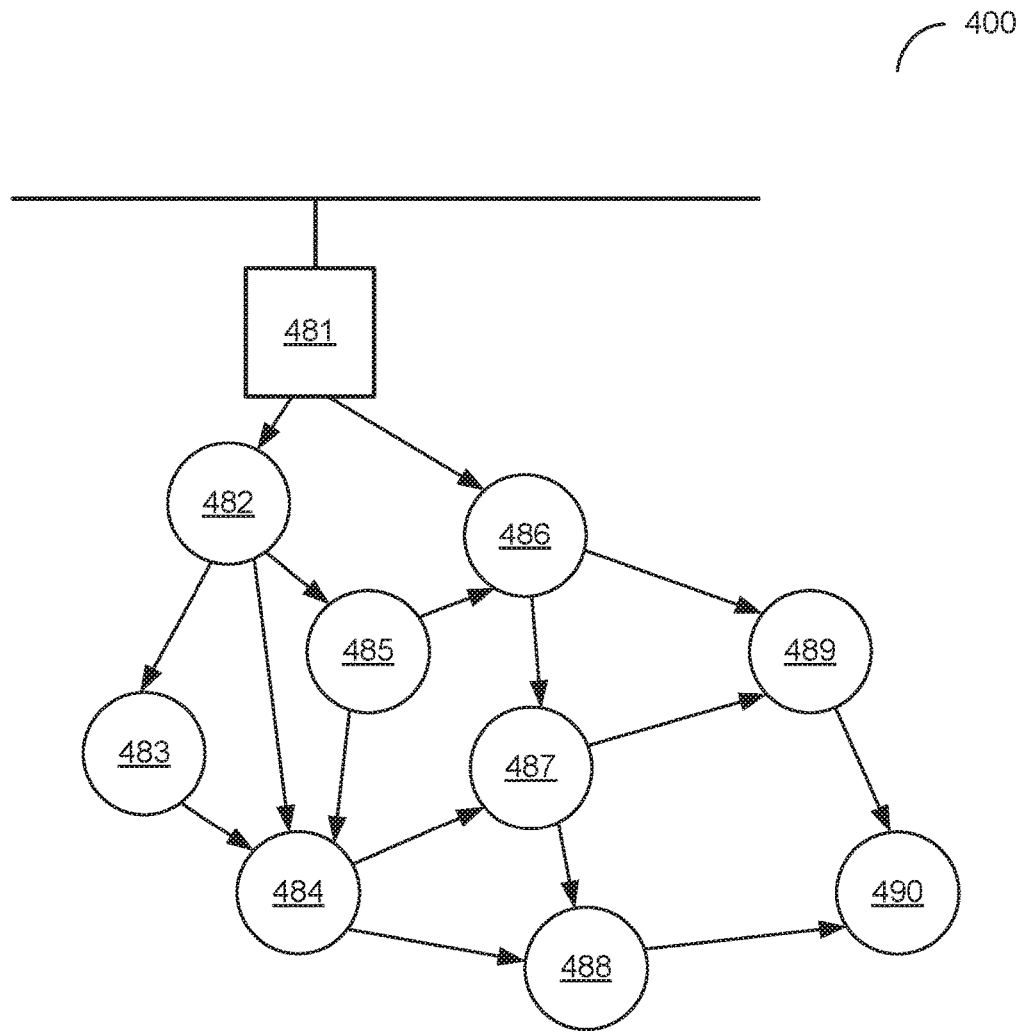
FIG. 4 schematically illustrates one embodiment of the proactive path selection mode in a wireless mesh network.

FIG. 4 schematically illustrates one embodiment of the proactive path selection mode in a wireless mesh network. In the example illustrated by FIG. 4, the wireless mesh network 400 may include nodes 481-490. In the proactive path selection mode, the source node 484 may implement a distance vector routing method to find and maintain a route to the network root 481. The root node 481 may maintain active paths to the plurality of nodes 482-489. Thus, the source node 484 may forward an outgoing frame to the root node 481, which may then forward it to the specified destination.

In one embodiment, the root node 481 may be advertised using a broadcast network management frame including the root announcement (RANN) information element. Each broadcast round may be identified by a respective DSN. Responsive to receiving a root announcement, a node (e.g., node 482 or 486) may build a route to the root node 481, e.g., by sending a unicast RREQ to the root node 481.

Alternatively, the routing tree building process may be initiated by the root node 481 by periodically broadcasting a proactive RREQ information element with the metric value initialized to zero. Each broadcast round may be identified by a respective DSN.

Responsive to receiving a RREQ, a node (e.g., node 482 or 486) may increment the metric field of the RREQ to reflect the airtime of the last hop leading to this node. The node may then create or update a route to the root node 481, and re-broadcast the RREQ by forwarding it to its neighboring nodes (e.g., nodes 483, 484, and 489). Thus, whenever an intermediate node forwards a RREQ, the metric field in the RREQ will be updated to reflect the cumulative metric of the route to the root node 481. A node may update its current route to the root node 481 if the RREQ contains a DSN exceeding the DSN associated with the existing route to the root node 481, or if the DSNs are the same and the RREQ provides a better metric value than the metric value associated with the existing route to the root node 481. Thus, the information about the presence of the root node 481 and routes to the root node 481 are disseminated to a plurality of nodes 482-490 of the wireless mesh network 400. Participating network nodes may store the created and/or updated routes in their respective routing tables.

In some embodiments, a node may transmit a network management frame including a route error (RERR) information element for announcing a broken link to other nodes that may have active paths over this broken link. For example, a node may transmit a RERR upon detecting a broken link on the next hop of an active path which is stored by the node. A node receiving the RERR may invalidate the paths to the unreachable destinations announced by the RERR. The node may also forward the RERR it to its neighboring nodes. In some embodiments, the node may initiate path discovery to one or more destinations announced by the RERR.

In one embodiment, RREQ, RREP, RERR and/or other information elements transmitted by the participating nodes may specify a time-to-live (TTL) value which is initialized to a pre-defined constant value by the originator node of the information element and represents the maximum number of hops that the information element is allowed to be forwarded. Accordingly, each receiving node may decrement the value of the TTL field before re-transmitting the information element, and may further discard the information element if the decremented value reaches zero.

In one embodiment, RREQ, RREP, RERR and/or other information elements transmitted by the participating nodes may further specify a hop count value which is initialized to zero by the originator node of the information element and is incremented by each receiving node before being forwarded. Thus, the hop count value represents the number of hops to the originator node, and may be combined with the metric value to determine the best path.

As noted herein above, a mesh network may utilize a single path selection metric for determining a single best route between the source and destination nodes. However, using the single path selection metric may not always produce the routes which are equally well-suited for various types of data being carried by the mesh network. For example, audio or video applications may require low latency delivery, while storage and other bulk transfer applications may require higher throughput while tolerating higher latency than audio or video applications. In another example, long range sensor applications may tolerate low throughput delivery.

Accordingly, the present disclosure provides a payload type-aware path selection approach, which provides multiple path selection metrics in a single mesh network. The source node and/or intermediate nodes may select one of the multiple path selection metrics based on the type of the transmitted data. Thus, the payload type-aware path selection may be viewed as a function of two parameters: the destination node identifier (e.g., the destination MAC address) and the path selection metric type.

In one example, the path selection metric may be designed to assign a low latency, moderate throughput path optimized for delivery of audio/video application traffic. Such a metric would favor (e.g., by assigning lower metric values) low latency hops while penalizing (e.g., by assigning higher metric values) low throughput hops. In one embodiment, the path selection metric may assign a value proportional to the latency of the frame transmission over a network path section including one or more hops. In another embodiment, the path selection metric may assign a value proportional to the latency of the frame transmission over a network path section including one or more hops, and may further assign a positive penalty value to each hop that has a throughput falling below a specified threshold throughput.

In another example, the path selection metric may be designed to assign a latency tolerant, high throughput path optimized for delivery of bulk transfer traffic (e.g., storage transfers or electronic mail message delivery). Such a metric would favor (e.g., by assigning lower metric values) high throughput hops, as long as their latency exceeds a specified minimum latency threshold. In one embodiment, the path selection metric may assign a value which is reverse proportional to the throughput of a network path section including one or more hops. In another embodiment, the path selection metric may assign a value which is reverse proportional to the throughput of a network path section including one or more hops, and may further assign a positive penalty value to each hop that has a latency exceeding a specified threshold latency.

In another example, the path selection metric may be designed to produce a low throughput path optimized for long range delivery of sensor application traffic. Such a metric would favor (e.g., by assigning lower metric values) low latency hops, as long as their throughput exceeds a specified minimum throughput threshold. In one embodiment, the path selection metric may assign a value proportional to the latency of the frame transmission over a network path section including one or more hops. In another embodiment, the path selection metric may assign a value proportional to the latency of the frame transmission over a network path section including one or more hops, and may further assign a positive penalty value to each hop that has a throughput falling below a specified threshold throughput.

In another example, the path selection metric may be designed to produce a low power consumption path optimized for frame delivery by battery operated nodes. Such a metric would favor the paths having lower number of hops serviced by least loaded nodes having at least a specified minimum threshold remaining battery life. In one embodiment, the path selection metric may assign a value proportional to the number of hops on the network paths. In another embodiment, the path selection metric may assign a value proportional to the number of hops on the network paths, and may further assign a positive penalty value to each hop that involves a node having a load level exceeding a specified threshold load level.

Figure 5:
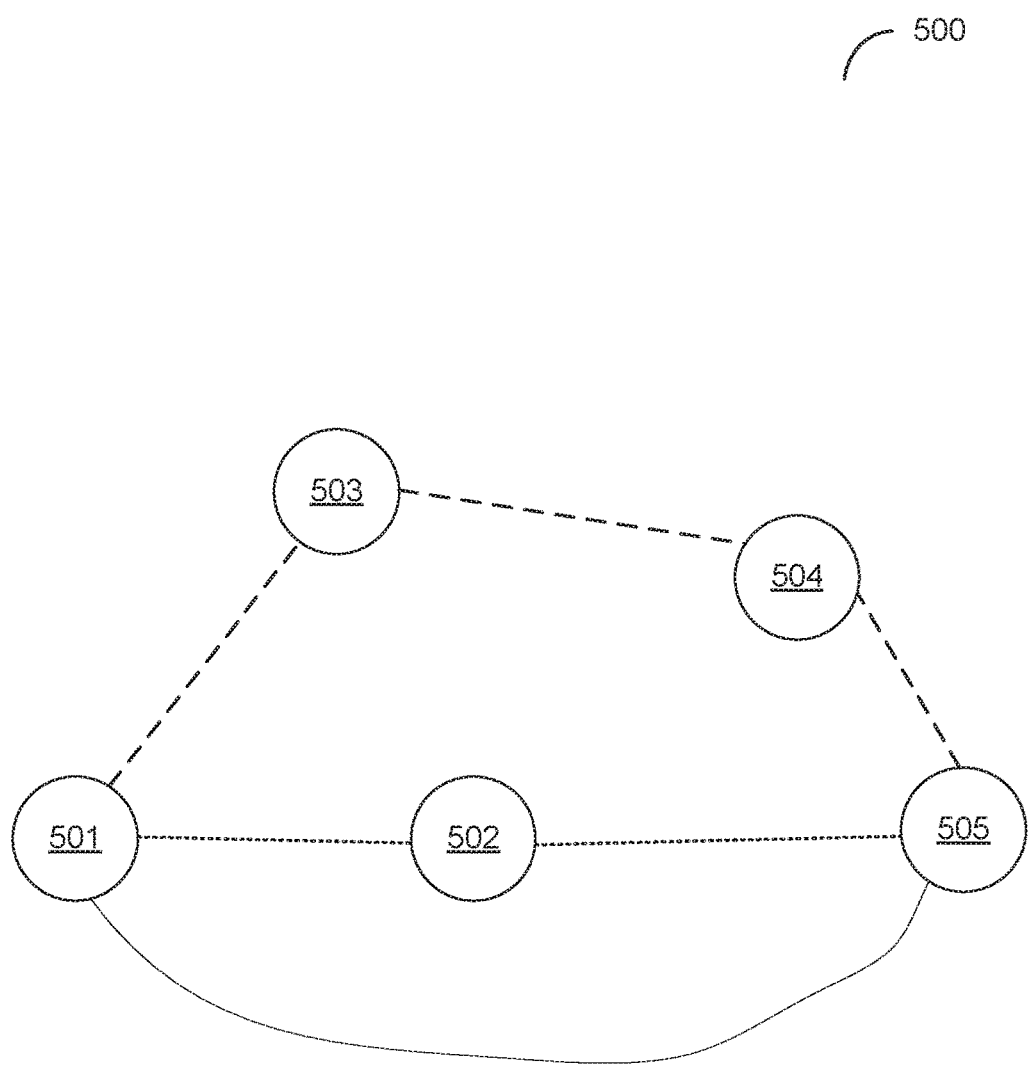
FIG. 5 schematically illustrates an example mesh network fragment topology for comparing single-metric and multiple-metric path selection implementations.

FIG. 5 schematically illustrates an example mesh network fragment topology for comparing single-metric and multiple-metric path selection implementations. As shown in FIG. 5, there are three mesh paths between the source node 501 and destination node 505: the two-hop path (shown by the dotted line) via an intermediate node 502, the single-hop direct path (shown by the solid line) to the destination 505, and the three-hop path (shown by the dashed line) via two intermediate nodes 503 and 504. A single-metric path selection protocol may produce a path between the source node 501 and the destination node 505 which optimizes the single path selection metric. Conversely, the multiple-metric selection method implemented in accordance with the embodiments of the present disclosure may produce multiple paths between the source node S and the destination node D, each path corresponding to the respective path selection metric. For example, the single-hop direct path to the destination may be produced by using the metric which optimizes the battery life of the mesh network, while the three-hop path via two intermediate nodes 503 and 504 may be produced by using the metric which optimizes the throughput if the wireless links between the pairs of nodes 501<-->503, 503<-->504, and 504<-->505 operate on different radio channels.

Figure 6:
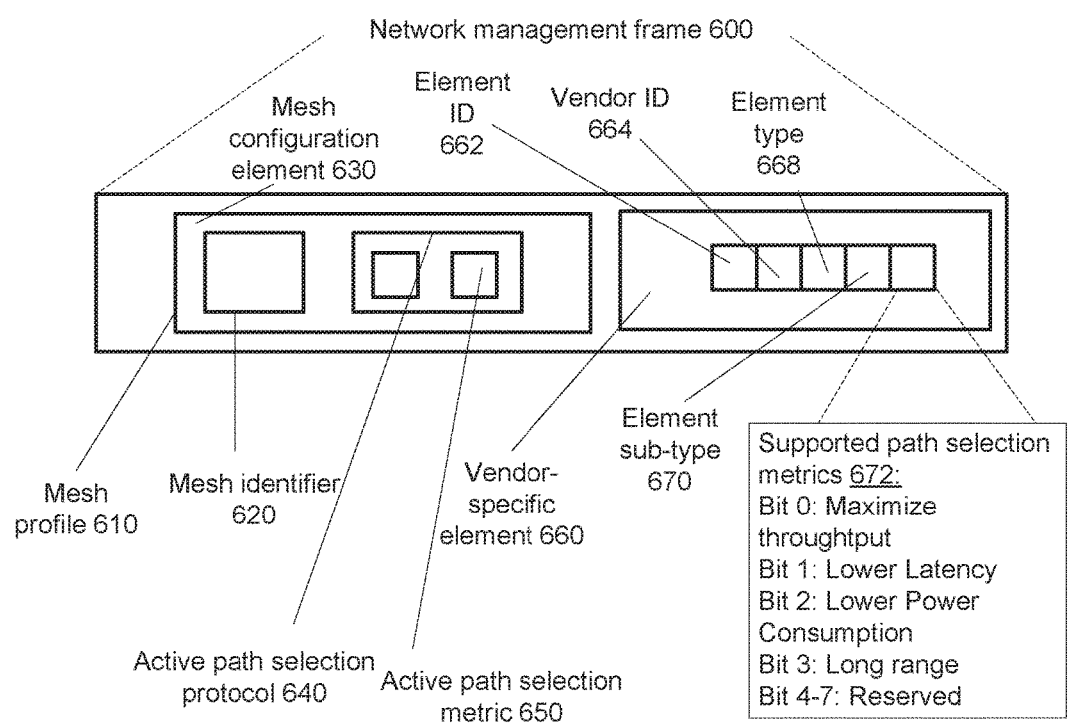
FIG. 6 schematically illustrates one embodiment of the structure of network management frames transmitted by mesh network nodes.

FIG. 6 schematically illustrates one embodiment of the structure of network management frames transmitted by mesh network nodes. As noted herein above, a network management frame 600 (e.g., beacon, probe request, or probe response frame) transmitted by a mesh network node may include a mesh profile 610, which in turn includes a mesh identifier 620 and a mesh configuration element 630. The network management frames may include various other elements and/or their fields, which are omitted from FIG. 6 for conciseness and clarity.

In mesh networks supporting a single path selection metric, the mesh configuration element 630 may specify, among other mesh network parameters, the active path selection protocol 640 and the active path selection metric 650. According to various embodiments of the present disclosure, in mesh networks supporting multiple path selection metrics, the path selection metric 650 defined by the mesh configuration element 630 may specify the default path selection metric, which may be utilized by legacy nodes which do not support multiple metrics and/or by any nodes when no specific path selection metric has been specified by one or more metric selection methods described in more detail herein below.

Mesh network nodes that support multiple path selection metrics may advertise the supported metrics in the network management frames, including beacon, probe request, and probe response frames transmitted by the node.

In one embodiment, the supported path selection metrics 672 may be specified by a vendor-specific information element 660 of the network management frame 600. The vendor-specific information element 660 may include the element identifier field 662, which may contain a value identifying the element 660 as a vendor-specific information element. The vendor-specific information element 660 may further include the vendor identifier field 664 identifying a vendor-specific implementation of the supported metrics. The vendor-specific information element 720 may further include the element type 668 and element sub-type 670 fields, which may contain values identifying the element 720 as being utilized for specifying the path selection metric to be used for route discovery.

The supported path selection metrics 672 may be encoded by one or more bits associated with the following values: bit "0" indicating the default metric, "1" indicating the metric maximizing the path throughput, "2" indicating the metric that produces lower latency paths, "3" indicating the metric producing the lower power consumption path, and "4" indicating the metric producing the long range paths. The numerical values for encoding metric types and corresponding metric descriptions are provided herein as illustrative examples only. Wireless mesh networks operating in accordance with the embodiments of the present disclosure may support various other metrics and their respective encodings.

The vendor-specific information element 660 may be omitted if all nodes support the same set of path discovery capabilities. The network management frame 600 may include various other elements and/or their fields, which are omitted from FIG. 6 for conciseness and clarity.

In one embodiment, a mesh network node, including the source node or an intermediate node, may select one of the supported metrics for transmitting one or more application data frames based on classification of the application data, which is described in more detail herein below. The mesh network node may specify the selected metric in RREQ, RREP, and RERR information elements of network management frames transmitted by the node.

Figure 7:
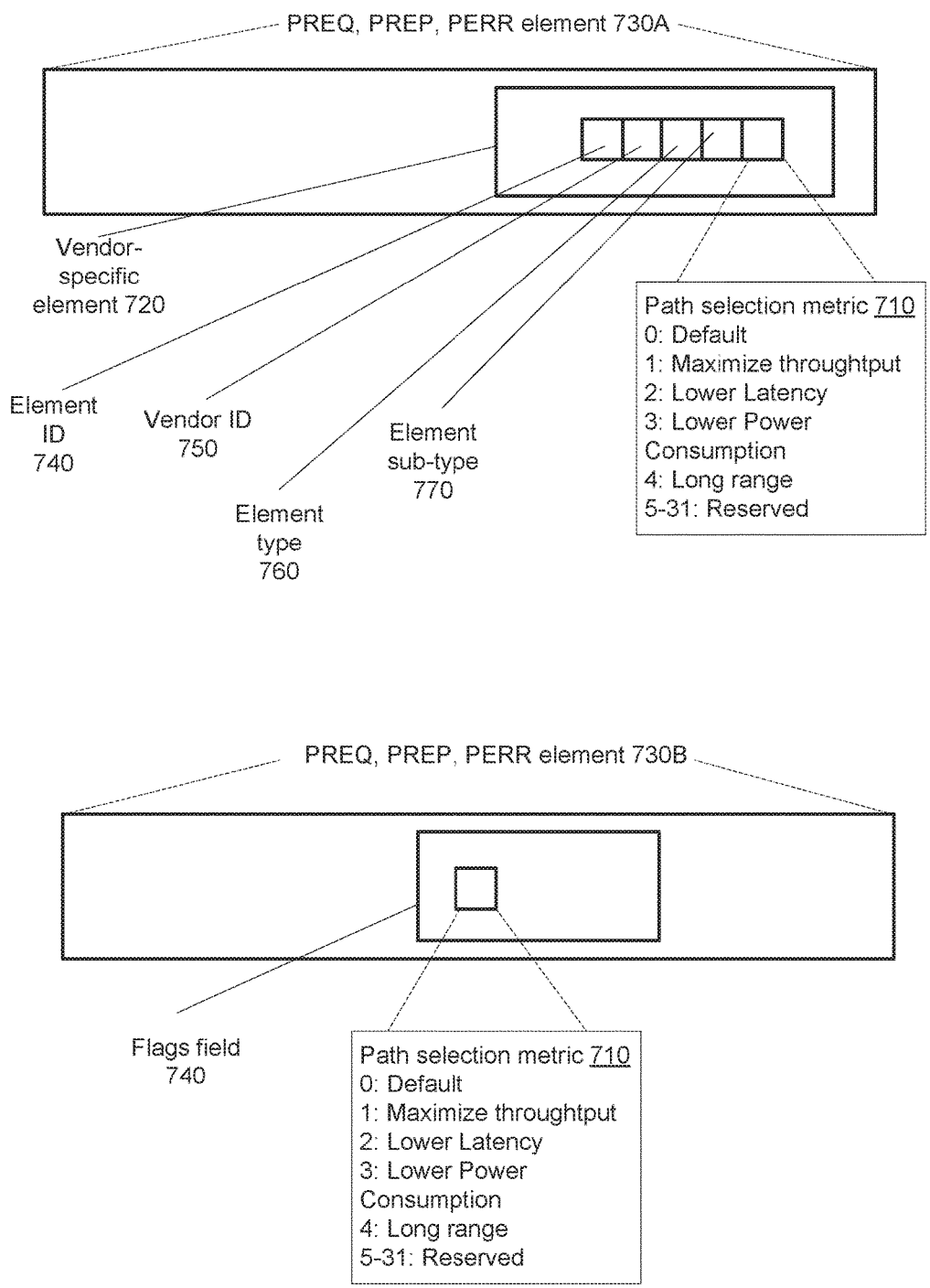
FIG. 7 schematically illustrates one embodiment of the structure of route request (RREQ), route reply (RREP), and route error (RERR) information elements of network management frames transmitted by mesh network nodes.

FIG. 7 schematically illustrates one embodiment of the structure of RREQ, RREP, and RERR information elements 730A-730B of network management frames transmitted by mesh network nodes. In one embodiment, a node may encode the path selection metric 710 to be utilized for path discovery in a vendor-specific information element 720 of RREQ, RREP, and RERR information element 730A of network management frames transmitted by the node. In one embodiment, the vendor-specific information element 720 may include the element identifier field 740, which may contain a value identifying the element 720 as a vendor-specific information element. The vendor-specific information element 720 may further include the vendor identifier field 750 identifying a vendor-specific implementation of the supported metrics. The vendor-specific information element 720 may further include the element type 760 and element sub-type 670 fields, which may contain values identifying the element 720 as being utilized for specifying the path selection metric to be used for route discovery.

Alternatively, a node may encode the metric type 710 to be utilized for path discovery in one or more existing reserved fields of RREQ, RREP, and RERR information element 730B, such as the "flags" field 740. The network management frames may include various other elements and/or their fields, which are omitted from FIG. 7 for conciseness and clarity.

The metric type 710 may be provided by one of the following values: "0" indicating the default metric, "1" indicating the metric maximizing the path throughput, "2" indicating the metric that produces lower latency paths, "3" indicating the metric producing the lower power consumption path, and "4" indicating the metric producing the long range paths. The numerical values for encoding metric types and corresponding metric descriptions are provided herein as illustrative examples only. Wireless mesh networks operating in accordance with the embodiments of the present disclosure may support various other metrics and their respective encodings.

As noted herein above, a mesh network node, including the source node or an intermediate node, may select one of the supported metrics for transmitting one or more application data frames based on classification of the application data. Such classification, which may reflect the payload type (e.g., audio/video, remote sensor, bulk data transfer, etc.), may be performed by mapping, e.g., by a memory data structure or an Application Programming Interface (API) call, values of one or more fields of the frame header and/or frame payload to the path selection metric type.

For example, the payload type classification may be performed based on the value of a virtual local area network (VLAN) tag of the application data frames. A VLAN may be represented by a logical network defined within a physical network. A VLAN identifier, or tag, may be inserted into the frame header and may be utilized by network switches and/or other network devices in order to determine how the frame should be processed (e.g., which switch ports a frame should be sent to). In one embodiment, certain bits of the VLAN tag may be reserved for encoding the path selection metric type. In another embodiment, the VLAN tag value may be mapped, by a memory data structure or an API call, to a corresponding path selection metric type.

In another example, the payload type classification may be performed based on the value of one or more IP header fields of the application data frames, such as Type of Service (ToS) or Differentiated Services Code Point (DSCP) fields. ToS or DSCP fields may be utilized by the networking stack to specify the frame priority. In one embodiment, the ToS or DSCP field value may be mapped, by a memory data structure or an API call, to a corresponding path selection metric type.

In another example, the payload type classification may be performed based on the value of one or more transport layer header fields of the application data frames, such as Transmission Control Protocol (TCP) port or User Datagram Protocol (UDP) source or destination ports. TCP or UDP port values may be utilized by the networking stack to specify the communication endpoints (e.g., sockets) on the source and destination hosts. In one embodiment, the TCP or UDP port may be mapped, by a memory data structure or an API call, to a corresponding path selection metric type.

In one embodiment, the source network node may tag the outgoing data frames with the path selection metric type, thus allowing the intermediate nodes to perform the application type-aware path selection for the frame forwarding. The source node may encode the path selection metric type using certain frame header fields, e.g., the vendor-specific protocol identifier of the Subnet Access Protocol (SNAP) field of the data link layer header of the transmitted data frames. The field is typically used by the networking stack to identify a protocol to be invoked to process the frame payload if two or more protocols co-exist within the same layer of the networking stack. In one embodiment, the SNAP field may be represented as xx-xx-AA-AA-03-yy-yy-yy-zz-zz, where xx-xx is frame length, yy-yy-yy is the vendor identifier, and zz represents the vendor-specific protocol identifier.

Accordingly, an intermediate network node may use the path selection metric type encoded in an incoming data frame in order to perform the path selection for forwarding the frame to its destination. The intermediate network node may specify the metric type in RREQ, RREP, and RERR information elements of network management frames transmitted by the node. In the absence of path selection metric tagging in an incoming data frame, the intermediate node may select one of the supported metrics for transmitting one or more application data frames based on classification of the application data as described herein above. Alternatively, an intermediate node may utilize the default path selection metric for path selection for untagged incoming frames.

Thus, the source and intermediate nodes may maintain, in their respective routing tables, multiple paths to the same destination using different path metrics associated with respective payload types. In other words, a network path to a given destination node may be viewed as a function of two parameters: the destination node identifier (e.g., the destination MAC address) and the identifier of the path selection metric. In order to maintain multiple paths to the same destination using path selection metrics of several different types, each network node may maintain multiple DSNs for every destination, such that each DSN corresponds to the respective path selection metric type.

FIG. 8 schematically illustrated an example structure of a routing table maintained by a mesh network node in one embodiment. An example routing table 800 can include a plurality of routing entries 810A-810Z. Each routing entry 810 may be identified by a combination of the destination node identifier 820 (represented, e.g., by the MAC address of the destination node) and the identifier 830 of the path selection metric that has been employed to produce the network path represented by the path selection entry. Each routing entry 810 may further include the DSN 840 maintained by the local mesh network node in association with the destination identified by the destination node identifier 820. Each routing entry 810 may further include the path selection metric value 850 of the network path represented by the path selection entry. Each routing entry 810 may further include the hop count 860 of the network path represented by the path selection entry. Each routing entry 810 may further include the identifier 870 of the next node on network path represented by the path selection entry. The routing table 800 may include various other fields which are omitted from FIG. 8 for clarity and conciseness.

While the example routing table 800 is depicted in FIG. 8 as a rectangular table, various data structures may be employed for storing the routing table in the memory of the mesh network node. For example, the routing table 800 may be stored as a two-dimensional array, each row of which represents a respective routing entry 810, and the columns represent the routing entry fields 820-870. In another example, the routing table 800 may be stored as a one-dimensional array of structures, such that each array element stores a structure representing a routing table entry 810 and includes the routing entry fields 820-870.

In one embodiment, the routing table 800 may be indexed by the combination of the destination node identifier 820 and the metric type 830, thus providing for the efficient search and retrieval of routing data. For example, a mesh network node may retrieve a routing entry identified by the combination of a particular destination and a specified path selection metric type in preparation for forwarding a data frame to the specified destination node along a network path determined using the specified path selection metric. In another example, a mesh network node may retrieve a routing entry identified by the combination of a particular destination and a specified path selection metric type in order to compare the metric value of the currently stored network path to the destination and the metric value specified by a RREQ or RREP information element. In another example, a mesh network node may retrieve a routing entry identified by the combination of a particular destination and a specified path selection metric type in order to invalidate the routing entry, e.g., in response to receiving a RREQ information element.

As noted herein above, a RREP received by a node is discarded if it specifies the DSN which is less than the current DSN maintained by the node in association with the destination node, thus providing for creation of loop-free paths. Accordingly, a node receiving a PERR may process by invalidating a stored route to the announced unreachable destination, if the route stored in the routing table of the receiving node is associated with the same metric type as the metric type encoded in the received PERR. In one example, a single PERR information element may include multiple entries, associated with the respective routing metric types, for the same unreachable destination, in which case the node receiving the PERR may invalidate multiple stored routes to the announced unreachable destination, if these stored routes are associated with the same metric types as the metric types encoded in the received PERR.

Figure 9:
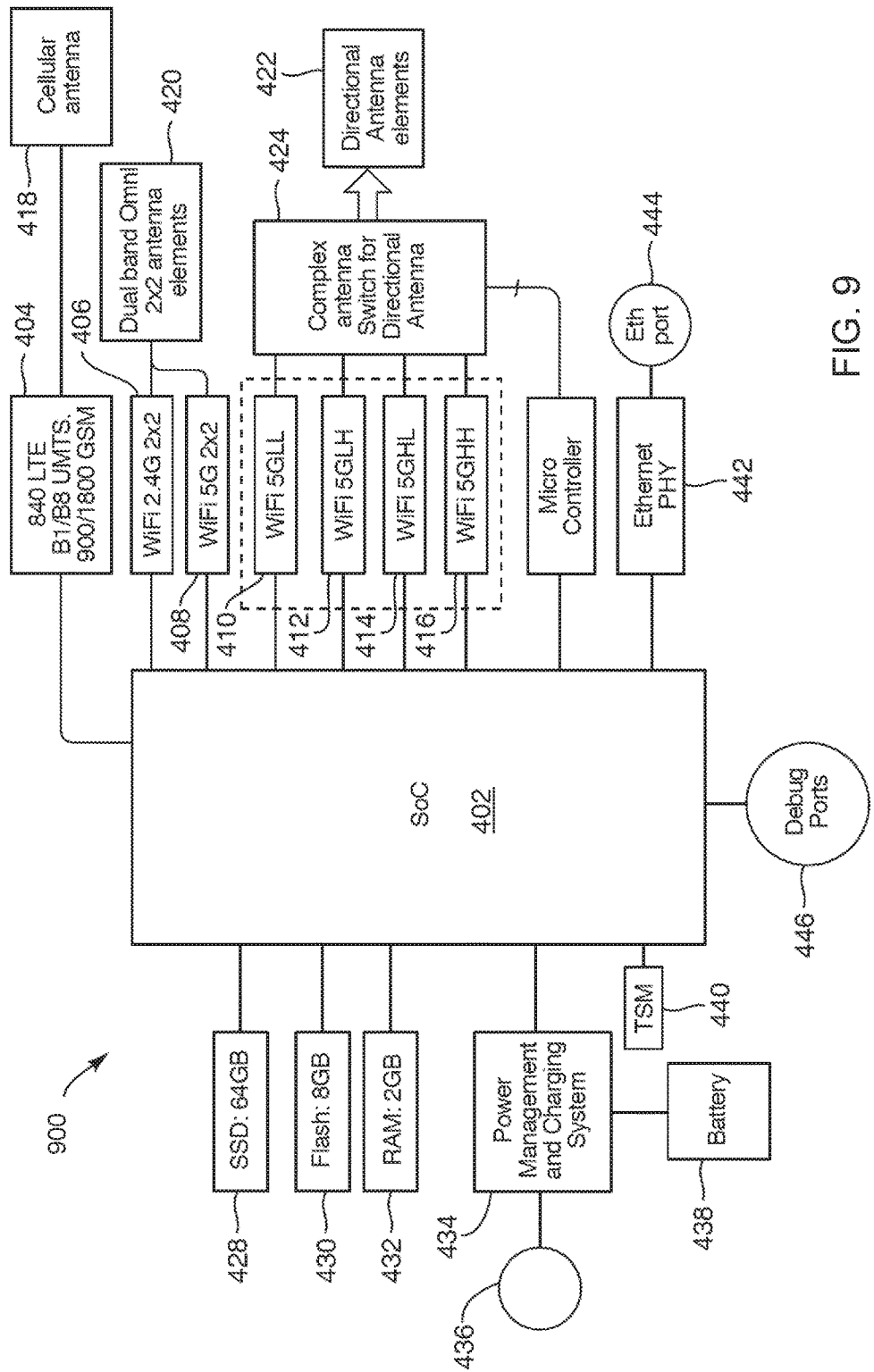
FIG. 9 is a block diagram of a mesh network device according to one embodiment.

FIG. 9 is a block diagram of a mesh network device 900 according to one embodiment. The mesh network device 900 may be one of many mesh network devices organized in a wireless mesh network (e.g., wireless mesh network 100). The mesh network device 900 is one of the nodes in a wireless mesh network in which the mesh network device 900 cooperates with other mesh network devices in distribution of content files to client consumption devices in an environment of limited connectivity to broadband Internet infrastructure, as described herein. The mesh network device 900 may be the mini-POP node 102 of FIG. 1. Alternatively, the mesh network device 900 may be any one of the mesh network devices 104-110 of FIG. 1. In another embodiment, the mesh network device 900 is any one of the network nodes 210-230 of FIG. 2.

The mesh network device 900 includes a system on chip (SoC) 402 to process data signals in connection with communicating with other mesh network devices and client consumption devices in the WMN. The SoC 402 includes a processing element (e.g., a processor core, a central processing unit, or multiple cores) that processes the data signals and controls the radios to communicate with other devices in the WMN. In one embodiment, the SoC 402 is a dual core SoC, such as the ARM A15 1.5 GHz with hardware network acceleration. The SoC 402 may include memory and storage, such as 2 GB DDR RAM and 64 GB eMMC coupled to the SoC 402 via external HDD interfaces (e.g., SATA, USB3, or the like). The SoC 402 may include multiple RF interfaces, such as a first interface to the first RF module 404 (e.g., HSCI interface for cellular module (3G)), a second interface to the WLAN 2.4 GHz radio 406, a third interface to the WLAN 2.4 GHz radio 408, and multiple interfaces to the WLAN 5 GHz radios, such as on a PCIe bus. In one embodiment, the SoC 402 is the IPQ8064 Qualcomm SoC or the IPQ4029 Qualcomm SoC. Alternatively, other types of SoCs may be used, such as the Annapurna SoC, or the like. Alternatively, the mesh network device 900 may include an application processor that is not necessarily considered to be a SoC.

The mesh network device 900 may also include memory and storage. For example, the mesh network device 900 may include SSD 64 GB 428, 8 GB Flash 430, and 2 GB 432. The memory and storage may be coupled to the SoC 402 via one or more interfaces, such as USB 3.0, SATA, or SD interfaces. The mesh network device 900 may also include a single Ethernet port 444 that is an ingress port for IP connection. The Ethernet port 444 is connected to the Ethernet PHY 442, which is connected to the SoC 402. The Ethernet port 444 can be used to service the mesh network device 900. Although the Ethernet port 444 could provide wired connections to client devices, the primary purpose of the Ethernet port 444 is not to connect to client devices, since the 2.4 GHz connections are used to connect to clients in the WMN. The mesh network device 900 may also include one or more debug ports 446, which are coupled to the SoC 402. The memory and storage may be used to cache content, as well as store software, firmware or other data for the mesh network device 900.

The mesh network device 900 may also include a power management and charging system 434. The power management and charging system 434 can be connected to a power supply 436 (e.g., 240V outlet, 120V outlet, or the like). The power management and charging system 434 can also connect to a battery 438. The battery 438 can provide power in the event of power loss. The power management and charging system 434 can be configured to send a SoS message on power outage and backup system state. For example, the WLAN radios can be powered down, but the cellular radio can be powered by the battery 438 to send the SoS message. The battery 438 can provide limited operations by the mesh network device 900, such as for 10 minutes before the entire system is completely powered down. In some cases, power outage will likely affect a geographic area in which the mesh network device 900 is deployed (e.g., power outage that is a neighborhood wide phenomenon). The best option may be to power down the mesh network device 900 and let the cloud service (e.g., back end service) know of the outage in the WMN. The power management and charging system 434 may provide a 15V power supply up to 21 watts to the SoC 402. Alternatively, the mesh network device 900 may include more or less components to operate the multiple antennas as described herein.

The mesh network device 900 includes a first radio frequency (RF) module 404 coupled between the SoC 402 and a cellular antenna 418. The first RF module 404 supports cellular connectivity using the cellular antenna 418. In one embodiment, the cellular antenna 418 includes a primary wide area network (WAN) antenna element and a secondary WAN antenna element. The first RF module 404 may include a modem to cause the primary WAN antenna, the secondary WAN antenna, or both to radiate electromagnetic energy in the 900 MHz band and 1900 MHz band for the 2G specification, radiate electromagnetic energy in the B1 band and the B8 band for the 3G specification, and radiate electromagnetic energy for the B40 band. The modem may support Cat3 band, 40 TD-LTE, UMTS: Band 1, Band 8, and GSM: 900/1900. The modem may or may not support CDMA. The cellular modem may be used for diagnostics, network management, down time media caching, meta data download, or the like. Alternatively, the first RF module 404 may support other bands, as well as other cellular technologies. The mesh network device 900 may include a GPS antenna and corresponding GPS module to track the location of the mesh network device 900, such as moves between homes. However, the mesh network device 900 is intended to be located inside a structure, the GPS antenna and module may not be used in some embodiments.

The mesh network device 900 includes a first set of wireless local area network (WLAN) modules 406, 408 coupled between the SoC 402 and dual-band omnidirectional antennas 420. A first WLAN module 406 may support WLAN connectivity in a first frequency range using one of the dual-band omnidirectional antennas 420. A second WLAN module 408 may support WLAN connectivity in a second frequency range using one of the dual-band omnidirectional antennas 420. The dual-band omnidirectional antennas 420 may be two omnidirectional antennas for 2.4 GHz. The directional antennas 422 may be eight sector directional antennas for 5 GHz with two antennas at orthogonal polarizations (horizontal/vertical) in each sector. These can be setup with 45 degree 3 dB beam width with 11 dB antenna gain. The dual-band omnidirectional antennas 420 and the directional antennas 422 can be implemented as a fully switchable antenna architecture controlled by micro controller 426. For example, each 5 GHz radio can choose any 2 sectors (for 2 2×2 MU-MIMO streams).

The mesh network device 900 includes a second set of WLAN modules 410-416 coupled between the SoC 402 and antenna switching circuitry 424. The second set of WLAN modules 410-416 support WLAN connectivity in the second frequency range using a set of directional antennas 422. The second set of WLAN modules 410-416 is operable to communicate with the other mesh network devices of the WMN. The antenna switching circuitry 424 is coupled to a micro controller 426. The micro controller 426 controls the antenna switching circuitry 424 to select different combinations of antennas for wireless communications between the mesh network device 900 and the other mesh network devices, the client consumption devices, or both. For example, the micro controller 426 can select different combinations of the set of directional antennas 422. In another embodiment, a filter switch bank is coupled between the antenna switching circuitry 424 and the second set of WLAN modules 410-416. In another embodiment, the filter switch bank can be implemented within the antenna switching circuitry 424.

In the depicted embodiment, the first set of WLAN modules include a first a first 2×2 2.4 GHz MIMO radio 406 and a 2×2 5 GHz MIMO radio 408. The second set of WLAN modules includes a first 2×2 5 GHz MIMO radio 410 ("SGLL"), a second 2×2 5 GHz MIMO radio 412 ("SGLH"), a third 2×2 5 GHz MIMO radio 414 ("SGHL"), and a fourth 2×2 5 GHz MIMO radio 416 ("SGHH"). The dual-band omnidirectional antennas 420 may include a first omnidirectional antenna and a second omnidirectional antenna (not individually illustrated in FIG. 4). The set of directional antennas 422 includes: a first horizontal orientation antenna; a first vertical orientation antenna; a second horizontal orientation antenna; a second vertical orientation antenna; a third horizontal orientation antenna; a third vertical orientation antenna; a fourth horizontal orientation antenna; a fourth vertical orientation antenna; a fifth horizontal orientation antenna; a fifth vertical orientation antenna; a sixth horizontal orientation antenna; a sixth vertical orientation antenna; a seventh horizontal orientation antenna; a seventh vertical orientation antenna; an eighth horizontal orientation antenna; an eighth vertical orientation antenna; a ninth antenna (upper antenna described herein); a tenth antenna (upper antenna); an eleventh antenna (bottom antenna); and a twelfth antenna (bottom antenna).

In one embodiment, the mesh network device 900 can handle antenna switching in a static manner. The SoC 402 can perform sounding operations with the WLAN radios to determine a switch configuration. Switching is not done on a per packet basis or at a packet level. The static switch configuration can be evaluated a few times a day by the SoC 402. The SoC 402 can include the intelligence for switching decision based on neighbor sounding operations done by the SoC 402. The micro controller 426 can be used to program the antenna switching circuitry 424 (e.g., switch matrix) since the mesh network device 900 may be based on CSMA-CA, not TDMA. Deciding where the data will be coming into the mesh network device 900 is not known prior to receipt, so dynamic switching may not add much benefit. It should also be noted that network backbone issues, such as one of the mesh network devices becoming unavailable, may trigger another neighbor sounding process to determine a new switch configuration. Once the neighbor sounding process is completed, the mesh network device 900 can adapt a beam patter to be essentially fixed since the mesh network devices are not intended to move once situated.

In one embodiment, the antenna switching circuitry 424 includes multiple diplexers and switches to connect different combinations of antennas to the multiple radios. One configuration for the antenna switching circuitry 424 is a switch matrix architecture. In this architecture, there are six 2×2 WLAN radios (also referred to as the Wi-Fi® radios). Five radios are 5 GHz band and one radio is a 2.4 GHz radio. A switch matrix is implemented to allow the connection of each and any of the four 2×2 radios to any of the Vx/Hx MIMO antennas. Based on the switch matrix configuration and based on the routing algorithms input, each 2×2 radio can connect to a specific antenna pair in a specific direction. Each 2×2 radio can operate using a dedicated and unique WLAN frequency channel concurrently or simultaneously. In this architecture, two of the radios (5 GHz radio and 2.4 GHz radio) may have fixed connections to the omnidirectional antennas (Ant0 and Ant1). These two radios may also have access to all the WLAN 2.4 GHz and 5 GHz band channels. In another embodiment, this architecture also may also have 4G/3G and 2G WAN radio to provide cellular connectivity to the mesh network device 900.

Figure 10:
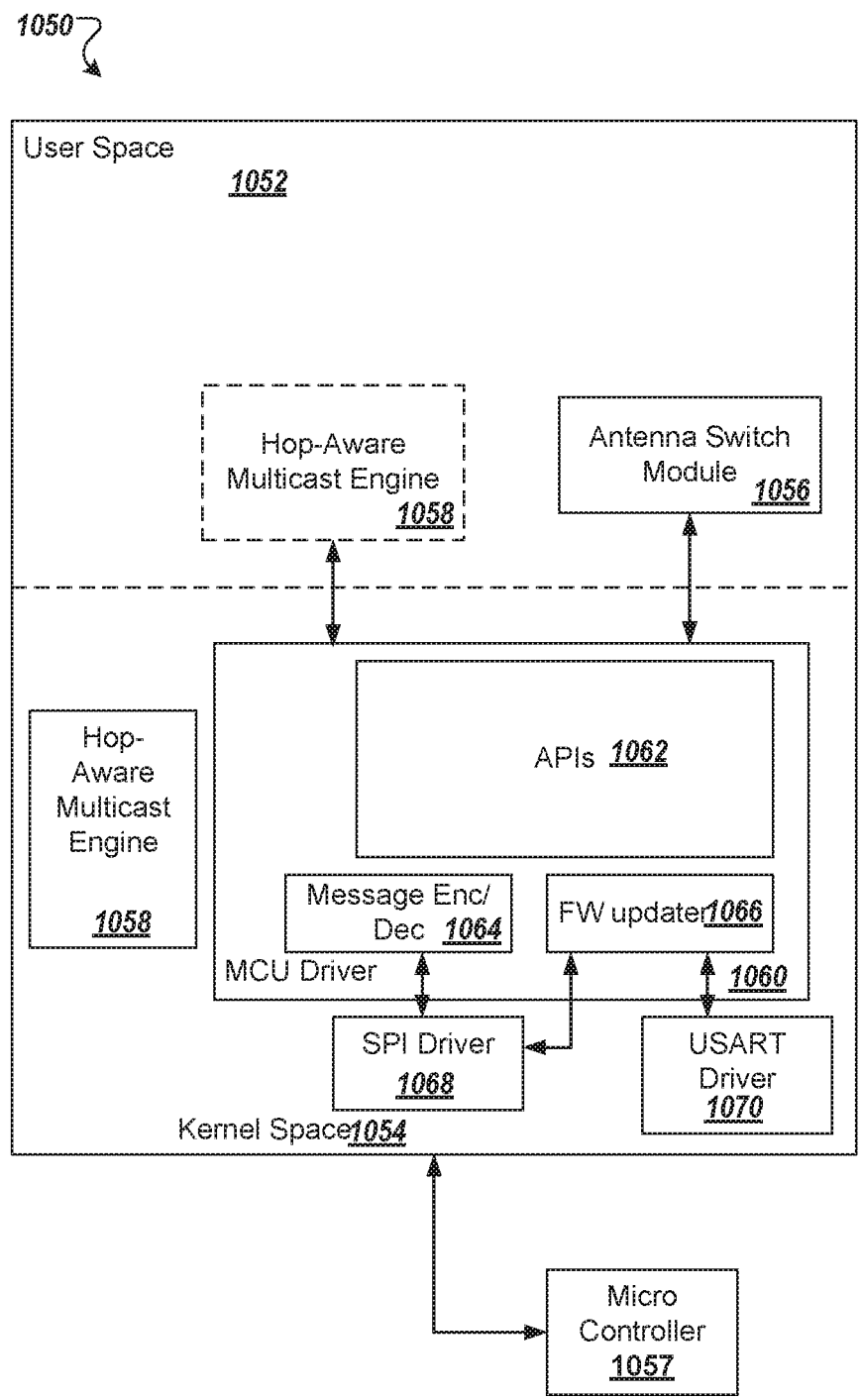
FIG. 10 is a block diagram of an application processor in which a payload type aware routing engine may be implemented according to one embodiment.

FIG. 10 is a block diagram of an application processor in which a payload type aware routing engine 1058 may be implemented according to one embodiment. The application processor 1050 executes an operating system that segregates memory (virtual memory) into user space 1052 and kernel space 1054. In this embodiment, payload type aware routing engine 1058 runs in the user space 1052. In other embodiments, some or the entire payload type aware routing engine 1058 can be implemented in the kernel space 1054. The payload type aware routing engine 1058 may be instructions that when executed by the application processor 1050 perform various network path selection operations as described below with respect to FIGS. 10-12. The payload type aware routing engine 1058 can perform the network path discovery using multiple path selecting metrics, as described herein. The application processor 1050 can communicate with neighbor mesh network devices to route data traffic on a network backbone of multiple P2P wireless connections between the mesh network devices.

In the kernel space 1054, a micro controller unit (MCU) driver 1060 can execute. The MCU driver 1060 may include multiple application programming interfaces (APIs) 1062 to interface to other components, such as the radios and micro controller, as described herein. The APIs 1062 can communicate messages to other components and may use a message encoder/decoder 1064 to encode and decode these messages. The APIs 1062 may include an API for getting firmware versions, an API for updating the firmware, and an API for getting radio information (e.g., radio configuration, antenna configuration, channel information, chamber/sector information, or the like). The MCU driver 1060 may also include a firmware (FW) updater 1066. Also, the kernel space 1054 may include a serial packet interface (SPI) driver 1068 and a Universal Synchronous/Asynchronous Receiver/Transmitter (USART) driver 1070.

In one embodiment, there is an interface mechanism between the user space 1052 and kernel space 1054 that has minimum latency. For example, in cases when there is an invalid configuration being input by an application, such as the payload type aware routing engine 1058, the error should be reported as quickly as possible to the application. The application processor 1050 may also include power management modules in the user space 1052 or in the kernel space 1054 since the application processor 1050 could be operating in a battery-backed operating state during power outages.

Figure 11:
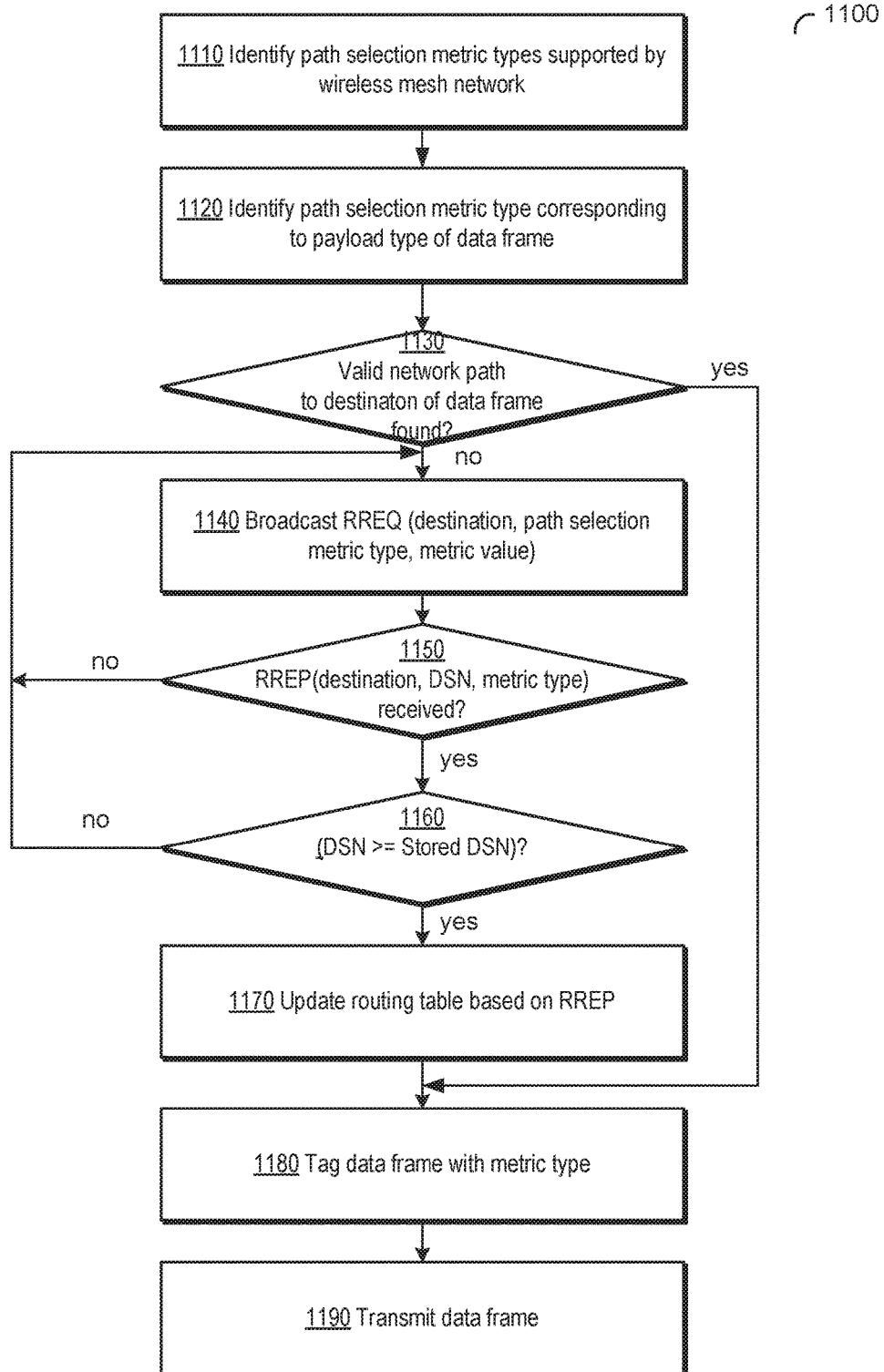
FIG. 11 is a flow diagram of one embodiment of a method for payload type aware network path selection by a source node of a data frame transmitted by a mesh network.

FIG. 11 is a flow diagram of one embodiment of a method for payload type aware network path selection by a source node of a data frame transmitted by a mesh network. The method 1100 may be performed by processing logic that includes hardware (e.g., circuitry, dedicated logic, programmable logic, microcode, etc.), software (e.g., instructions run on a processor to perform hardware simulation), or a combination thereof. In one embodiment, the method 1100 may be performed by any one of the mesh network devices 108-110 of FIG. 1. Alternatively, the method 1100 may be performed by any one of the network nodes 210-230 of FIG. 2. Alternatively, the method 1100 may be performed by the mesh network device 900 of FIG. 9. Alternatively, the method 1100 may be performed by the application processor 1050 of FIG. 10.

Referring to FIG. 11, at block 1110, the network device implementing the functions of the source node may identify a plurality of path selection metric types supported by the wireless mesh network. As noted herein above, the path selection metric types supported by the MBSS may be specified by the mesh configuration element of beacon, probe request, and/or probe response frames that may be received by the network device upon booting up.

At block 1120, the network device may identify a path selection metric type corresponding to the type of the payload of an outgoing data frame. In one embodiment, the network device may identify a metric type corresponding to the payload type of the data frame and ascertain that the identified metric type is one of the metric types that are supported by the wireless mesh network. If the identified metric type is not supported by the wireless mesh network, the network device may select the default metric type (e.g., the metric type identified by a pre-defined identifier).

Identifying the metric type corresponding to the payload type of the data frame (e.g., audio/video, remote sensor, bulk data transfer, etc.) may be performed by mapping, e.g., by a memory data structure or an Application Programming Interface (API) call, values of one or more fields of the frame header and/or frame payload to the path selection metric type, as described in more detail herein above. In one example, the chosen path selection metric may favor (e.g., by assigning lower metric values) low latency paths, by assigning a lower metric value for a section of the network path which provides the lower latency than another section of the network path (and will accordingly be assigned a higher metric value than that of the first section of the network path). In another example, the chosen path selection metric may favor (e.g., by assigning lower metric values) higher throughput paths, by assign a lower metric value for a section of the network path which provides the higher throughput than another section of the network path (and will accordingly be assigned a higher metric value than that of the first section of the network path). In yet another example, the chosen path selection metric may favor (e.g., by assigning lower metric values) paths having lower number of hops, by assigning a lower metric value for a section of the network path which has lower number of hops than another section of the network path (and will accordingly be assigned a higher metric value than that of the first section of the network path).

Responsive to determining, at block 1130, that a valid network path to the destination node is stored, by the routing table maintained by the network device, in association with the identified path selection metric type, the method may branch to block 1180. Otherwise, if such a path could not be found in the local routing table, the processing may continue at block 1140.

At block 1140, the network device may initiate the path discovery by broadcasting, to its neighboring nodes, a network management frame including a route request information element specifying the destination node of the data frame and the path selection metric type, as described in more detail herein above.

Responsive to receiving, at block 1150, a route reply identifying the destination node, the network device may, at block 1160, ascertain that the DSN provided by the route reply matches or exceeds the DSN stored by the network device in association with the destination node, and may further ascertain that the metric type specified by the route reply matches the metric type that was specified by the route request. If both conditions are met, the network device may, at block 1170, update its routing table to store the path to the destination node, in association with the path selection metric type specified by the route reply.

At block 1180, the network device may tag the data frame with the path selection metric type, thus allowing the intermediate nodes to perform the application type-aware path selection for the frame forwarding. The source node may encode the path selection metric type using certain frame header fields, as described in more detail herein above.

At block 1190, the network device may transmit the data frame to the next node specified by the determined network path (e.g., to an intermediate node between the source node and the destination node), as described in more detail herein above.

Figure 12:
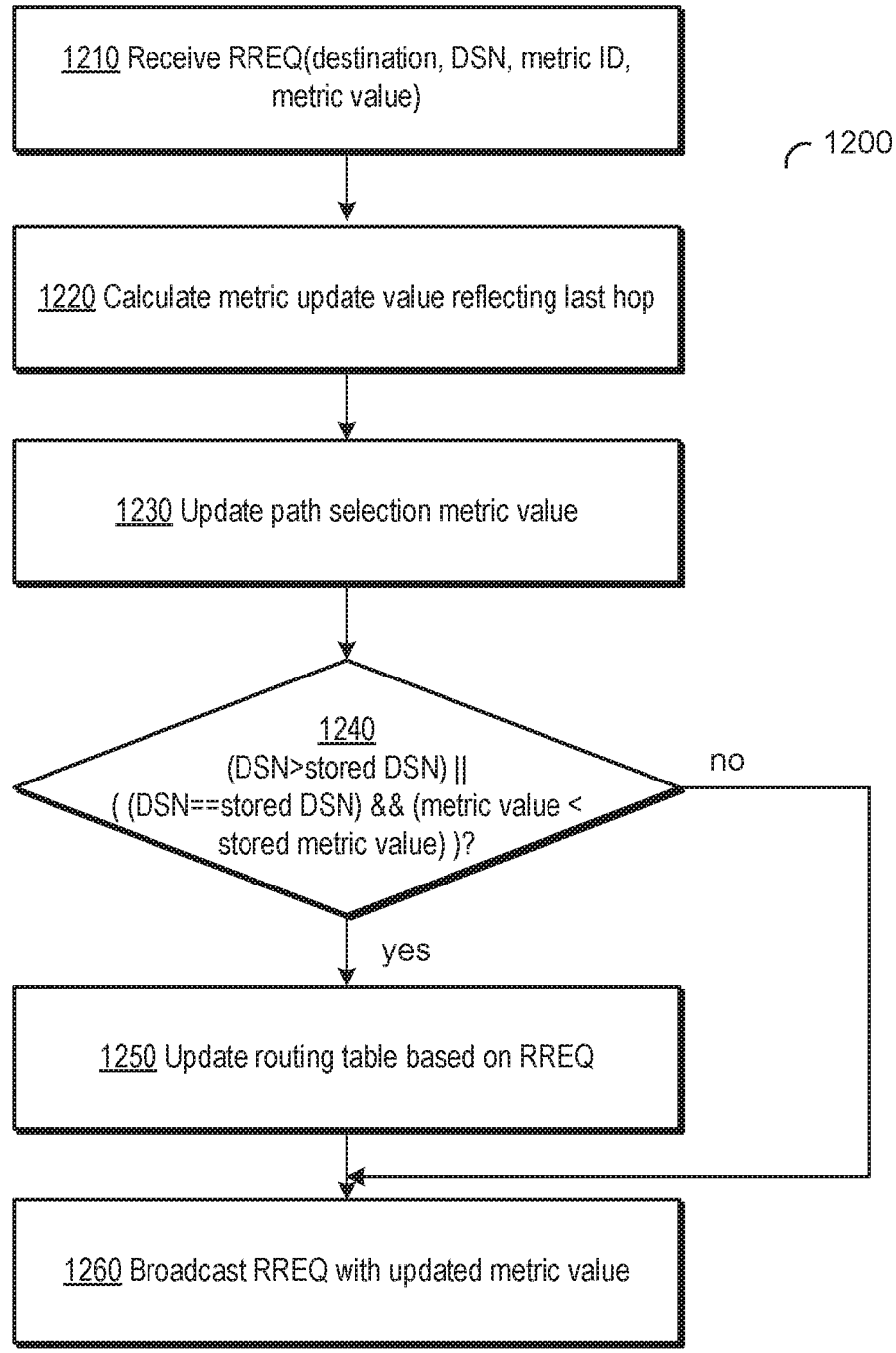
FIG. 12 is a flow diagram of one embodiment of a method for payload type aware network path selection by an intermediate or a destination node responding to a route request for path discovery in a mesh network.

FIG. 12 is a flow diagram of one embodiment of a method for payload type aware network path selection by an intermediate or a destination node responding to a route request for path discovery in a mesh network. The method 1200 may be performed by processing logic that includes hardware (e.g., circuitry, dedicated logic, programmable logic, microcode, etc.), software (e.g., instructions run on a processor to perform hardware simulation), or a combination thereof. In one embodiment, the method 1200 may be performed by any one of the mesh network devices 108-120 of FIG. 1. Alternatively, the method 1200 may be performed by any one of the network nodes 210-230 of FIG. 2. Alternatively, the method 1200 may be performed by the mesh network device 900 of FIG. 9. Alternatively, the method 1200 may be performed by the application processor 1050 of FIG. 10.

Referring to FIG. 12, at block 1210, the network device implementing the functions of an intermediate node between the source node and the destination node may receive, from a neighboring node of the mesh network, a network management frame including a route request. The route request may specify, among other parameters, the destination node, the DSN, the path selection metric type to be utilized for the path discovery, and the path selection metric value.

At block 1220, the network device may calculate, using the identified path selection metric, the path selection metric update value reflecting one or more characteristics of transmission of the network management frame over the last hop leading to this node, i.e., the hop between this node and the node from which the network management frame has been received. As explained herein above, example characteristics of transmission of the network management frame over the last hop may include the throughput of the last hop, the latency of the last hop, or the delivery time of the frame over the last hop.

In one embodiment, the network device may maintain a memory data structure that includes a plurality of records, such that each record maps a path selection metric type to a pointer to an executable code module that computes the path selection metric of the corresponding type and returns the metric value.

At block 1230, the network device may update, using the calculated path selection metric update value, the current path selection metric value specified by the route request. In one embodiment, updating the path selection metric value by the intermediate node may involve adding the computed path selection metric update value to the current path selection metric value (e.g., if the chosen path selection metric produces an additive characteristic, such as the airtime or the latency of the delivery, in which case each candidate path is characterized by a sum of additive metric values of all links comprised by the path).

Responsive to determining, at block 1240, that the DSN specified by the route request exceeds the stored DSN associated with the combination of the source node identifier and the path selection metric type, or that the DSNs are the same and that the updated path selection metric value is better than the path selection metric value associated with an existing network path to the source node utilizing the same path selection metric, the network device may, at block 1250, update its routing table to store the new path to the source node, in association with the DSN and the path selection metric type specified by the route request. The new path may specify the neighboring mesh network node from which the RREQ has been received as the next hop hope on the path to the source node. While updating path to the source node is not needed for processing and forwarding the RREQ, it may still be performed by intermediate nodes in order to reduce the management frame traffic in the network.

At block 1260, the network device may forward the RREQ by broadcasting it to neighboring nodes of the mesh network. The forwarded RREQ may specify the updated path selection metric value, as described in more detail herein above.

Figure 13:
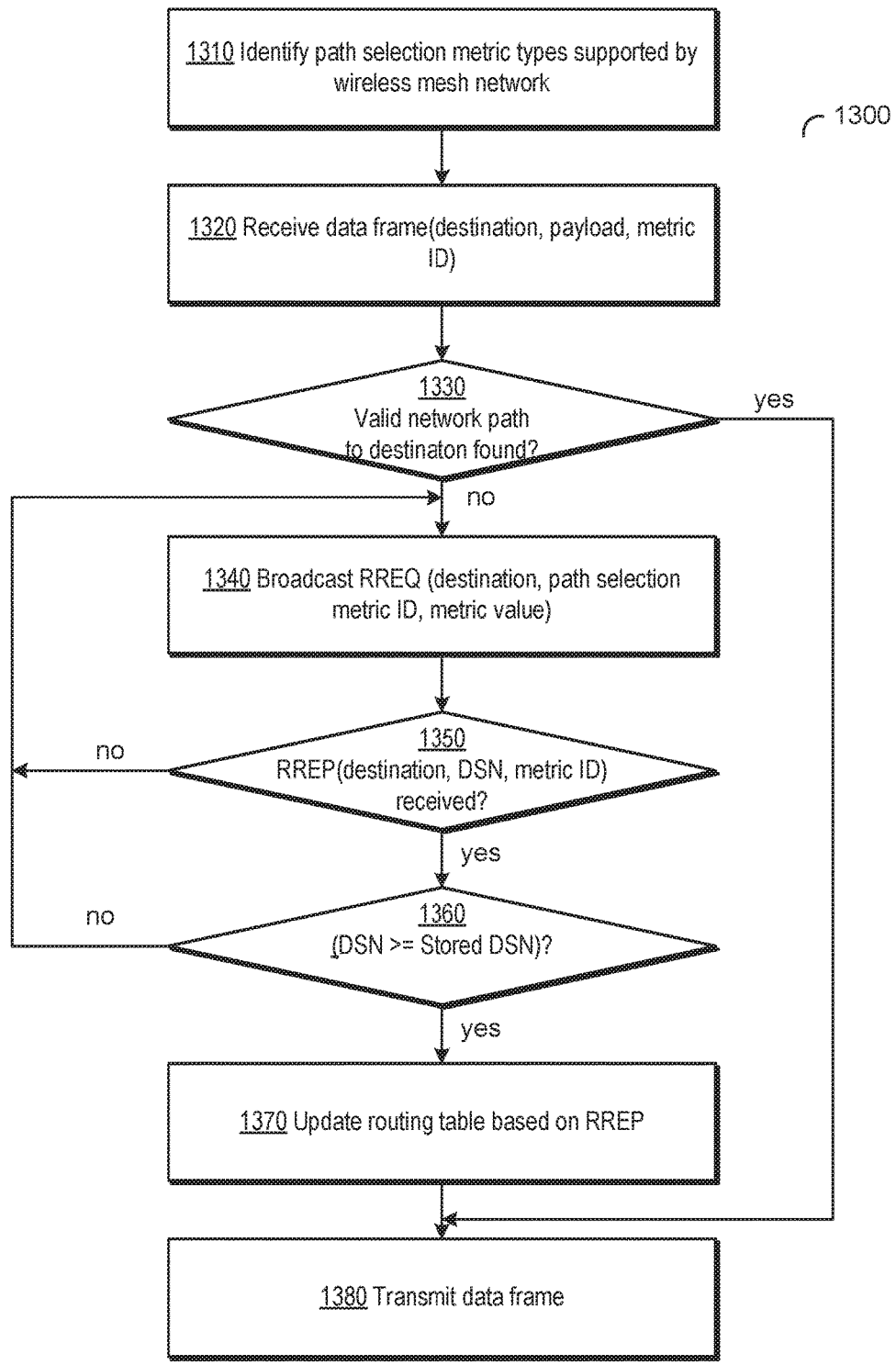
FIG. 13 is a flow diagram of one embodiment of a method for payload type aware network path selection by an intermediate node of a mesh network for transmitting a data frame.

FIG. 13 is a flow diagram of one embodiment of a method for payload type aware network path selection by an intermediate node of a mesh network for transmitting a data frame. The method 1300 may be performed by processing logic that includes hardware (e.g., circuitry, dedicated logic, programmable logic, microcode, etc.), software (e.g., instructions run on a processor to perform hardware simulation), or a combination thereof. In one embodiment, the method 1300 may be performed by any one of the mesh network devices 108-130 of FIG. 1. Alternatively, the method 1300 may be performed by any one of the network nodes 210-230 of FIG. 2. Alternatively, the method 1300 may be performed by the mesh network device 900 of FIG. 9. Alternatively, the method 1300 may be performed by the application processor 1050 of FIG. 10.

Referring to FIG. 13, at block 1310, the network device implementing the functions of the intermediate node may identify a plurality of path selection metric types supported by the wireless mesh network. As noted herein above, the path selection metric types supported by the MBSS may be specified by the mesh configuration element of beacon, probe request, and/or probe response frames that may be received by the network device upon booting up.

At block 1320, the network device may receive a data frame including a tag identifying a path selection metric type corresponding to the payload type of the data frame. In one embodiment, the network device may ascertain that the identified metric type is one of the metric types that are supported by the wireless mesh network. If the identified metric type is not supported by the wireless mesh network, the network device may select the default metric type for forwarding the received data frame.

Responsive to determining, at block 1330, that a valid network path to the destination node is stored by the routing table of the network device in association with the chosen path selection metric type, the method may branch to block 1380. Otherwise, if such a path could not be found in the local routing table, the processing may continue at block 1340.

At block 1340, the network device may initiate the path discovery by broadcasting, to its neighboring nodes, a route request specifying the destination node and the chosen path selection metric type, as described in more detail herein above.

Responsive to receiving, at block 1350, a route reply identifying the destination node, the network device may, at block 1360, ascertain that the DSN provided by the route reply matches or exceeds the DSN stored by the network device in association with the destination node, and may further ascertain that the metric type specified by the route reply matches the chosen metric type. If both conditions are met, the network device may, at block 1370, update its routing table to store the path to the destination node, in association with the chosen path selection metric type and the path selection metric value identified by the route reply. The network path may identify the next hope node, i.e., an intermediate node on the path between this node and the destination node.

At block 1380, the network device may transmit the data frame to the next hop node specified by the identified network path, as described in more detail herein above.

In the above description, numerous details are set forth. It will be apparent, however, to one of ordinary skill in the art having the benefit of this disclosure, that embodiments may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "inducing," "parasitically inducing," "radiating," "detecting," "determining," "generating," "communicating," "receiving," "disabling," or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Embodiments also relate to an apparatus for performing the operations herein. This apparatus may be specially constructed for the required purposes, or it may include a general-purpose computer selectively activated or reconfigured by a computer program stored in the computer. Such a computer program may be stored in a computer readable storage medium, such as, but not limited to, any type of disk including floppy disks, optical disks, CD-ROMs and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general-purpose systems may be used with programs in accordance with the teachings herein, or it may prove convenient to construct a more specialized apparatus to perform the required method steps. The required structure for a variety of these systems will appear from the description below. In addition, the present embodiments are not described with reference to any particular programming language. It will be appreciated that a variety of programming languages may be used to implement the teachings of the present invention as described herein. It should also be noted that the terms "when" or the phrase "in response to," as used herein, should be understood to indicate that there may be intervening time, intervening events, or both before the identified operation is performed.

It is to be understood that the above description is intended to be illustrative, and not restrictive. Many other embodiments will be apparent to those of skill in the art upon reading and understanding the above description. The scope of the present embodiments should, therefore, be determined with reference to the appended claims, along with the full scope of equivalents to which such claims are entitled.

What is claimed is:

1. A method, comprising:
    receiving, by a first mesh network device of a wireless mesh network, a beacon frame identifying a plurality of path selection metric types supported by the wireless mesh network;
    identifying, based on an outgoing data frame, a path selection metric type, from among the plurality of path selection metric types, corresponding to a payload type of the outgoing data frame;
    determining, using the path selection metric type, information about a network path to a destination mesh network device for the outgoing data frame, wherein the information about the network path comprises an identifier of an intermediate mesh network device located between the first mesh network device and the destination mesh network device; and
    transmitting the outgoing data frame to the intermediate mesh network device.

2. The method of claim 1, wherein transmitting the outgoing data frame to the intermediate mesh network device comprises:
    encoding the path selection metric type into a pre-determined field of a header of the outgoing data frame.

3. The method of claim 1, wherein determining the information about the network path to the destination mesh network device comprises:
    broadcasting a route request specifying the destination mesh network device and the path selection metric type.

4. The method of claim 1, wherein determining the information about the network path to the destination mesh network device comprises:
    identifying, using a routing table, a known network path to the destination mesh network device, wherein the known network path is associated with the path selection metric type.

5. The method of claim 1, wherein identifying the path selection metric type comprises:
    identifying a payload type included in a virtual local area network (VLAN) tag comprised by a header of the outgoing data frame; and
    identifying the path selection metric type by looking up the payload type in a memory data structure mapping the payload type to the path selection metric type.

6. The method of claim 1, wherein identifying the path selection metric type comprises:
    identifying the payload type included in a Differentiated Services Code Point (DSCP) field of a header of the outgoing data frame; and
    identifying the path selection metric type by looking up the payload type in a memory data structure mapping the payload type to the path selection metric type.

7. The method of claim 1, wherein identifying the path selection metric type comprises:

identifying the payload type included in a Transmission Control Protocol (TCP) port field of a header of the outgoing data frame; and identifying the path selection metric type by looking up the payload type in a memory data structure mapping the payload type to the path selection metric type.

8. The method of claim 1, wherein identifying the path selection metric type comprises:

identifying the payload type included in a Datagram Protocol (UDP) port field of a header of the outgoing data frame; and identifying the path selection metric type by looking up the payload type in a memory data structure mapping the payload type to the path selection metric type.

9. The method of claim 1, wherein the path selection metric type specifies one of: a path selection metric reflecting a throughput of the network path or a path selection metric reflecting a number of intermediate mesh network devices of the network path.

10. A first mesh network device of a wireless mesh network, comprising: a radio frequency (RF) module; and an application processor coupled to the RF module, wherein the application processor comprises a payload type aware routing engine, wherein the payload type aware routing engine:

receives, using the RF module, from a second mesh network device of the wireless mesh network, a first route request identifying a destination mesh network device of the wireless mesh network, a path selection metric type, and a first path selection metric value;

determines, using the path selection metric type, a second path selection metric value reflecting a characteristic of transmission of the first route request over a network hop between the second mesh network device and the first mesh network device;

generates a third path selection metric value using the first path selection metric value and the second path selection metric value; and broadcasts, using the RF module, a second route request identifying the destination mesh network device, the path selection metric type, and the third path selection metric value.

11. The first mesh network device of claim 10, wherein the characteristic includes a latency of transmission of the first route request over the network hop.

12. The first mesh network device of claim 10, wherein the characteristic includes a throughput of the network hop.

13. The first mesh network device of claim 10, wherein to generate the third path selection metric value, the routing engine adds the first path selection metric value and the second path selection metric value.

14. A method, comprising:

identifying, by a first mesh network device of a wireless mesh network, a plurality of path selection metric types supported by the wireless mesh network;

receiving a data frame comprising a payload and an identifier of a path selection metric type corresponding to the payload;

determining that the path selection metric type is comprised by the plurality of path selection metric types supported by the wireless mesh network;

determining, using the path selection metric type, an information about a network path to a destination mesh network device of an outgoing data frame, wherein the information about the network path comprises a first destination sequence number (DSN) and an identifier of an intermediate mesh network device between the first mesh network device and the destination mesh network device;

determining that the first DSN matches or exceeds a second DSN stored by the first mesh network device in association with the destination mesh network device; and transmitting the outgoing data frame to the intermediate mesh network device.

15. The method of claim 14, wherein determining the information about the network path comprises:

identifying, using a routing table, a known network path to the destination mesh network device, wherein the known network path is associated with the path selection metric type corresponding to the payload of the data frame.

16. The method of claim 14, wherein determining the information about the network path comprises:

broadcasting a route request specifying the destination mesh network device and the path selection metric type corresponding to the payload of the data frame.

17. The method of claim 14, wherein identifying the plurality of path selection metric types supported by the wireless mesh network comprises:

receiving a network management frame specifying the plurality of path selection metric types.

18. The method of claim 14, wherein the path selection metric type specifies a path selection metric reflecting a throughput of the network path.

19. The method of claim 14, wherein the path selection metric type specifies a path selection metric reflecting a power consumption of mesh network devices comprised by the network path.

20. The method of claim 14, wherein the path selection metric type specifies a path selection metric reflecting a number of intermediate mesh network devices of the network path.

* * * * *